US012330418B2

(12) United States Patent
Mori et al.

(10) Patent No.: US 12,330,418 B2
(45) Date of Patent: Jun. 17, 2025

(54) LIQUID DISCHARGE HEAD AND LIQUID DISCHARGE DEVICE

(71) Applicant: SEIKO EPSON CORPORATION, Tokyo (JP)

(72) Inventors: Masaki Mori, Shiojiri (JP); Yu Shiozawa, Shiojiri (JP); Motoki Takabe, Shiojiri (JP); Hitoshi Takaai, Azumino (JP); Eiju Hirai, Azumino (JP); Michiya Kubokawa, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/812,302

(22) Filed: Jul. 13, 2022

(65) Prior Publication Data

US 2023/0020673 A1 Jan. 19, 2023

(30) Foreign Application Priority Data

Jul. 14, 2021 (JP) ................................ 2021-116436

(51) Int. Cl.
*B41J 2/14* (2006.01)

(52) U.S. Cl.
CPC .. *B41J 2/14233* (2013.01); *B41J 2002/14491* (2013.01)

(58) Field of Classification Search
None
See application file for complete search history.

(56) References Cited

U.S. PATENT DOCUMENTS

2005/0190240 A1* 9/2005 Takatsuka ............ B41J 2/04563 347/68
2011/0242185 A1 10/2011 Watanabe
2011/0316935 A1 12/2011 Sato et al.
2012/0075387 A1* 3/2012 Owaki ................ B41J 2/14274 347/65
2018/0264807 A1* 9/2018 Ito ........................... B41J 2/161

FOREIGN PATENT DOCUMENTS

JP 2010-069756 4/2010
JP 2011-207077 10/2011
JP 2012-011560 A 1/2012

* cited by examiner

*Primary Examiner* — Erica S Lin
(74) *Attorney, Agent, or Firm* — WORKMAN NYDEGGER

(57) ABSTRACT

A liquid discharge head includes a pressure chamber substrate that has a plurality of pressure chambers, a piezoelectric element that is laminated at the pressure chamber substrate, and has an individual electrode individually provided for each of the plurality of pressure chambers, a common electrode commonly provided for the plurality of pressure chambers, and a piezoelectric body provided between the individual electrode and the common electrode in a lamination direction of the piezoelectric element and provided to apply pressure to a liquid in the pressure chamber, a drive wiring that is electrically coupled to the individual electrode and the common electrode, and provided to apply a voltage for driving the piezoelectric body to the piezoelectric body, and a heating resistor that is formed of the same material as any of the individual electrode, the common electrode, and the drive wiring, and provided to heat the liquid in the pressure chamber.

20 Claims, 9 Drawing Sheets

LIQUID DISCHARGE HEAD AND LIQUID DISCHARGE DEVICE

The present application is based on, and claims priority from JP Application Serial Number 2021-116436, filed Jul. 14, 2021, the disclosure of which is hereby incorporated by reference herein in its entirety.

BACKGROUND

1. Technical Field

The present disclosure relates to a liquid discharge head and a liquid discharge device.

2. Related Art

A liquid discharge head including a pressure chamber for discharging a liquid and a heater for heating ink flowing in the liquid discharge head is known (for example, JP-A-2012-11560). In the liquid discharge head, the heater is a film heater that seals a heating wire, and is provided on a side surface of a head case of the liquid discharge head.

In the related art, since a distance between a heater and a pressure chamber, which greatly contributes to the discharge of a liquid, is long, there is a limit to accurately adjusting a temperature of the liquid in the pressure chamber. Therefore, there is a demand for disposing the heater in the vicinity of the pressure chamber. However, when the film heater is provided in the vicinity of the pressure chamber of a liquid discharge head, there is a problem that a size of the liquid discharge head is increased.

SUMMARY

The present disclosure can be realized in the following aspects.

According to a first aspect of the present disclosure, there is provided a liquid discharge head. The liquid discharge head includes a pressure chamber substrate that has a plurality of pressure chambers, a piezoelectric element that is laminated at the pressure chamber substrate, and has an individual electrode individually provided for each of the plurality of pressure chambers, a common electrode commonly provided for the plurality of pressure chambers, and a piezoelectric body provided between the individual electrode and the common electrode in a lamination direction of the piezoelectric element and provided to apply pressure to a liquid in the pressure chamber, a drive wiring that is electrically coupled to the individual electrode and the common electrode, and provided to apply a voltage for driving the piezoelectric body to the piezoelectric body, and a heating resistor that is formed of the same material as any of the individual electrode, the common electrode, and the drive wiring, and provided to heat the liquid in the pressure chamber.

According to a second aspect of the present disclosure, there is provided a liquid discharge device. The liquid discharge device includes the liquid discharge head according to the first aspect, and a control section that controls a discharge operation of a liquid from the liquid discharge head.

DESCRIPTION OF EXEMPLARY EMBODIMENTS

A. First Embodiment

Figure 1:
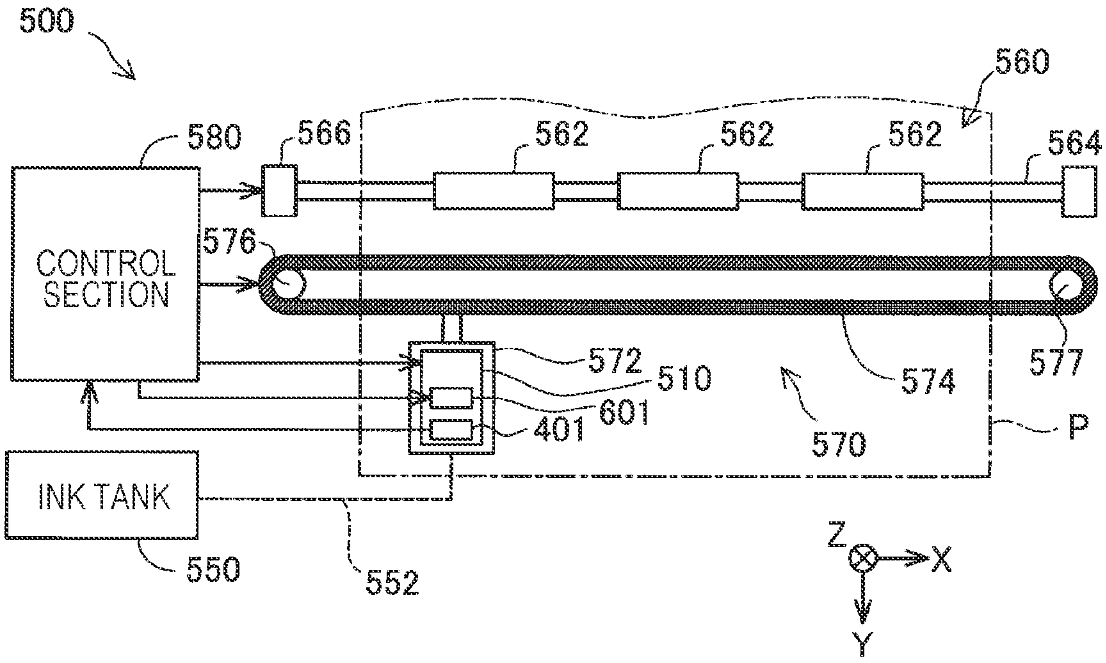
FIG. 1 is an explanatory diagram showing a schematic configuration of a liquid discharge device including a liquid discharge head as a first embodiment.

FIG. 1 is an explanatory diagram showing a schematic configuration of a liquid discharge device 500 including a liquid discharge head 510 as a first embodiment of the present disclosure. In the present embodiment, the liquid discharge device 500 is an ink jet printer that discharges ink as an example of a liquid onto printing paper P to form an image. The liquid discharge device 500 may use any kind of medium, such as a resin film or a cloth, as an ink discharge target, instead of the printing paper P. In FIG. 1 and each drawings subsequent to FIG. 1, X, Y, and Z represent three spatial axes orthogonal to each other. In the present specification, directions along the axes are also referred to as an X-axis direction, a Y-axis direction, and a Z-axis direction. When specifying the direction, a positive direction is "+" and a negative direction is "−" so that positive and negative signs are used together in the direction notation, and description will be performed while a direction to which an arrow faces in each figure is the + direction and an opposite direction thereof is the − direction. In the present embodiment, the Z direction coincides with a vertical direction, the +Z direction indicates vertically downward, and the −Z direction indicates vertically upward. Further, when the positive direction and the negative direction are not limited, the three X, Y, and Z will be described as the X axis, the Y axis, and the Z axis.

As shown in FIG. 1, the liquid discharge device 500 includes a liquid discharge head 510, an ink tank 550, a transport mechanism 560, a moving mechanism 570, and a control section 580. The liquid discharge head 510 has a detection resistor 401 and a heating resistor 601 as will be described later. A plurality of nozzles are formed in the liquid discharge head 510. The liquid discharge head 510 discharges, for example, black, cyan, magenta, and yellow inks in a total of four colors in the +Z direction to form an image on the printing paper P. The liquid discharge head 510 is mounted on the carriage 572 and reciprocates in a main scanning direction with the movement of the carriage 572. In the present embodiment, the main scanning directions are the +X direction and the −X direction. The liquid discharge head 510 may discharge ink of a random color such as light cyan, light magenta, or white, while not being limited to the four colors.

The ink tank 550 accommodates the ink discharged from the liquid discharge head 510. The ink tank 550 is coupled to the liquid discharge head 510 by a resin tube 552, and the ink in the ink tank 550 is supplied to the liquid discharge head 510 via the tube 552. Instead of the ink tank 550, a bag-shaped liquid pack formed of a flexible film may be provided.

The transport mechanism 560 transports the printing paper P in a sub-scanning direction. The sub-scanning direction is a direction that intersects the X-axis direction, which is a main scanning direction, and is the +Y direction and the −Y direction in the present embodiment. The transport mechanism 560 includes a transport rod 564, on which three transport rollers 562 are mounted, and a transport motor 566 for rotatably driving the transport rod 564. When the transport motor 566 rotatably drives the transport rod 564, the printing paper P is transported in the +Y direction, which is the sub-scanning direction. The number of the transport rollers 562 is not limited to three and may be a random number. Further, a configuration, in which a plurality of transport mechanisms 560 are provided, may be provided.

The moving mechanism 570 includes a transport belt 574, a moving motor 576, and a pulley 577, in addition to the carriage 572. The carriage 572 mounts the liquid discharge head 510 in a state where the ink can be discharged. The carriage 572 is fixed to the transport belt 574. The transport belt 574 is bridged between the moving motor 576 and the pulley 577. When the moving motor 576 is rotatably driven, the transport belt 574 reciprocates in the main scanning direction. As a result, the carriage 572 fixed to the transport belt 574 also reciprocates in the main scanning direction.

The control section 580 controls the entire liquid discharge device 500. For example, the control section 580 controls, for example, a reciprocating operation of the carriage 572 along the main scanning direction, a transport operation of the printing paper P along the sub-scanning direction, and a discharge operation of the liquid discharge head 510. The control section 580 heats the liquid in the pressure chamber 12 by the heating resistor 601 provided in the liquid discharge head 510. In the present embodiment, the control section 580 can further detect the temperature of the pressure chamber 12 by the detection resistor 401 provided in the liquid discharge head 510. The control section 580 also functions as a drive control section for the piezoelectric element 300, as will be described later. As described above, in the present embodiment, the control section 580 detects the temperature of the pressure chamber 12 and adjusts the temperature of the pressure chamber 12 by heating. The control section 580 controls the discharge of the ink to the printing paper P by outputting a drive signal based on the detected temperature of the pressure chamber 12 to the liquid discharge head 510 to drive the piezoelectric element 300. The control section 580 may be composed of, for example, one or more processing circuits, such as a Central Processing Unit (CPU) or a Field Programmable Gate Array (FPGA), and one or more storage circuits such as a semiconductor memory. In the present embodiment, the control section 580 stores in advance a correspondence relationship between an electric resistance value of the detection resistor 401 and a temperature in the storage circuit.

Figure 2:
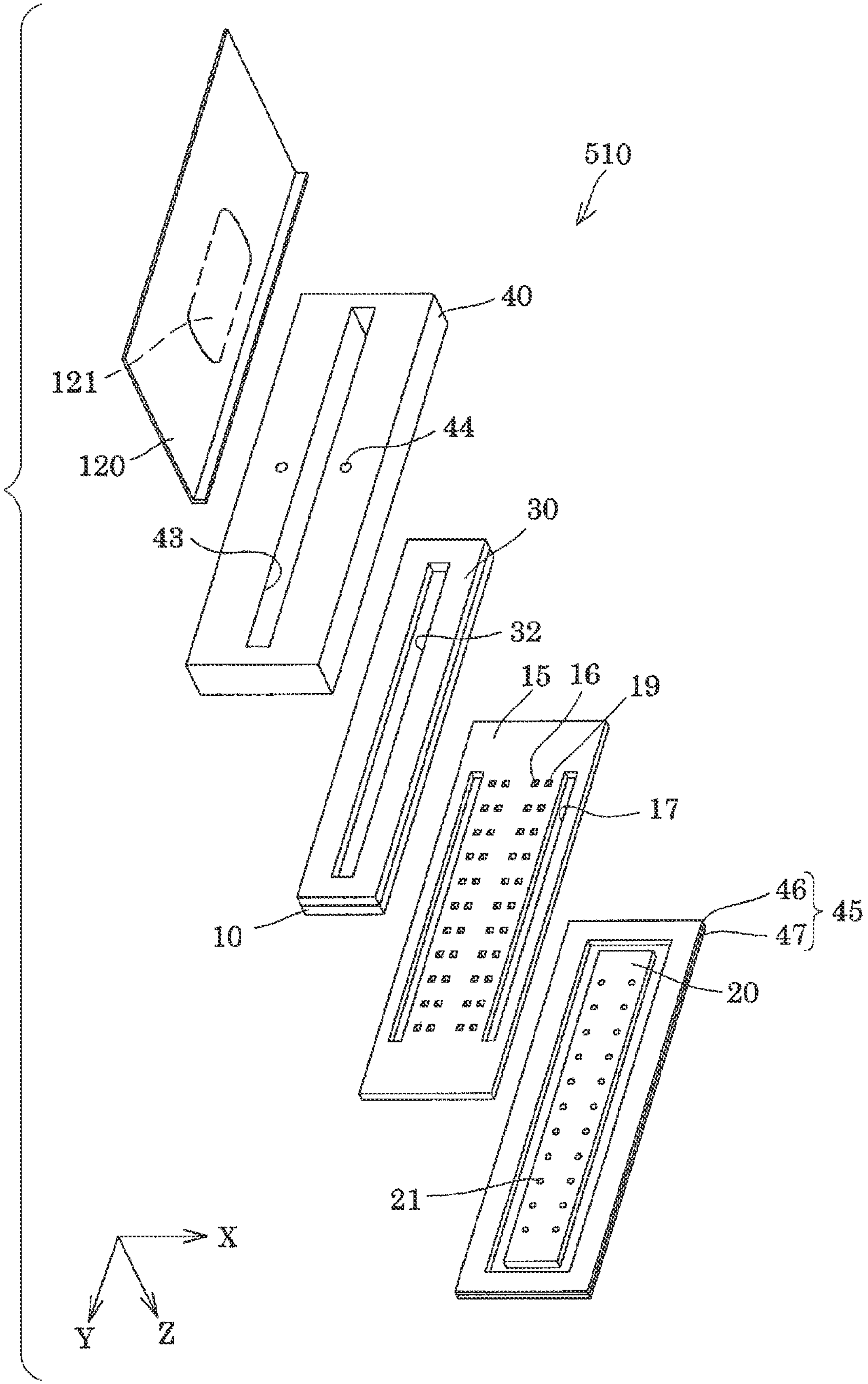
FIG. 2 is an exploded perspective view showing a configuration of a liquid discharge head.
Figure 3:
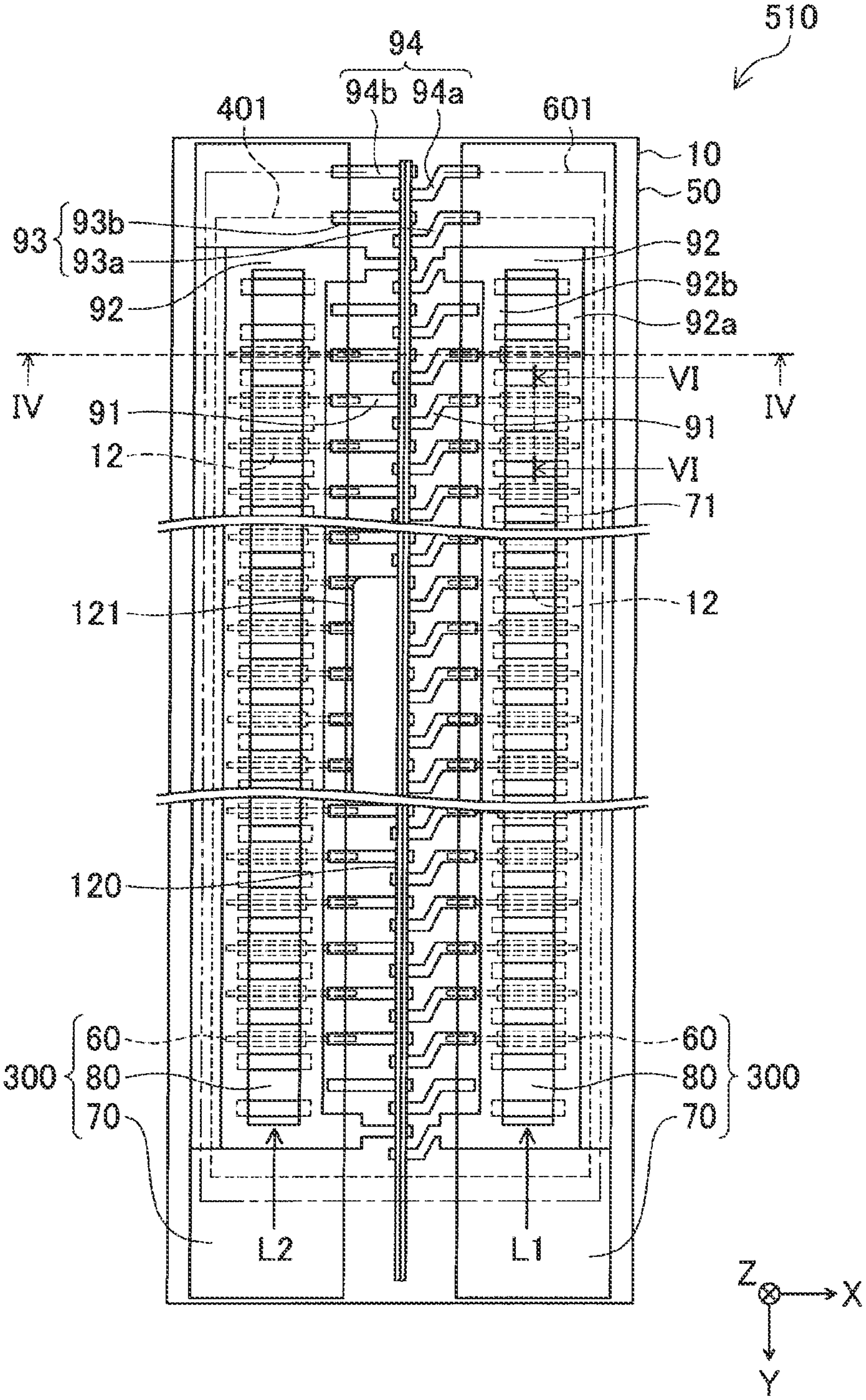
FIG. 3 is an explanatory diagram showing a configuration of a liquid discharge head in plan view.
Figure 4:
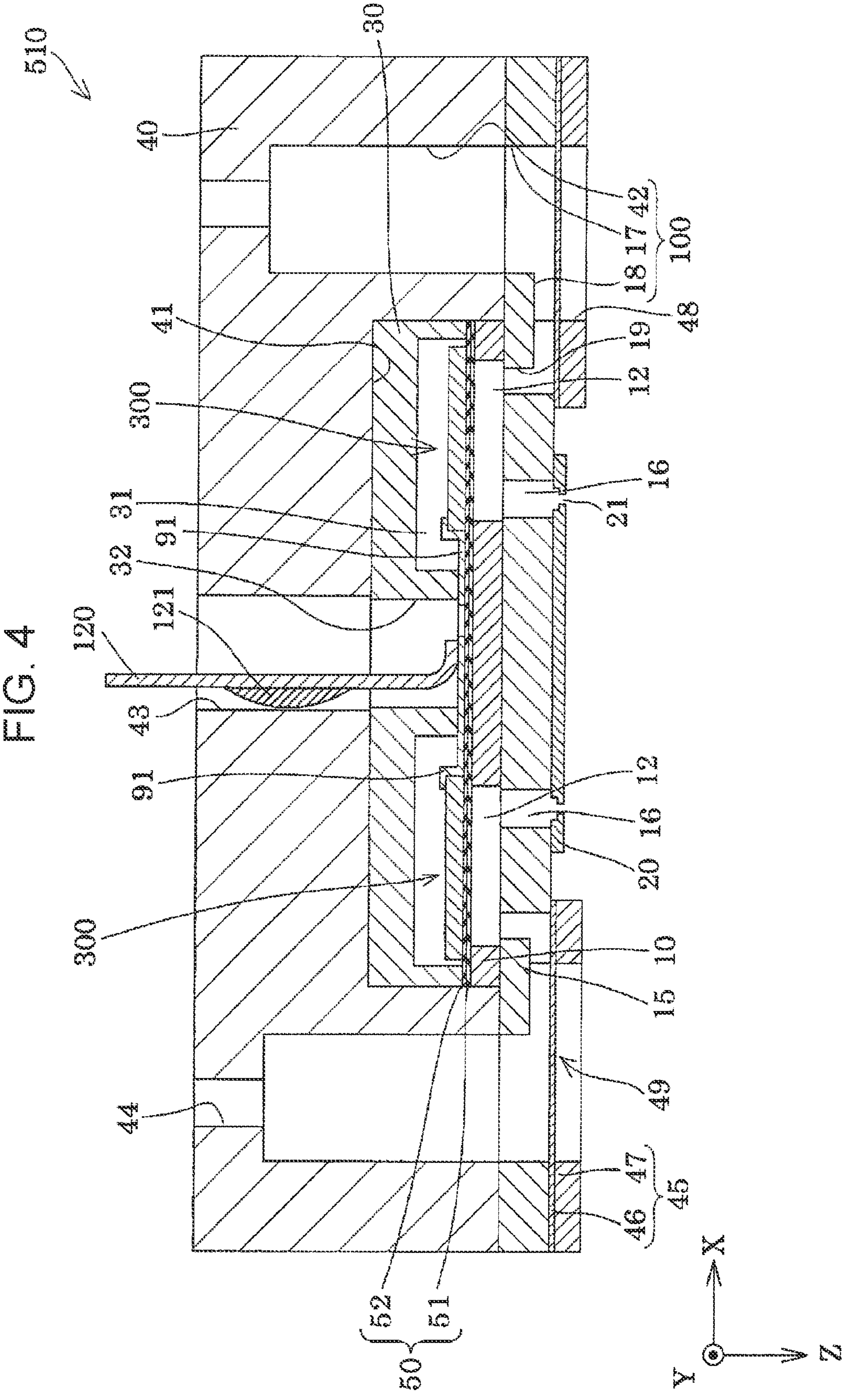
FIG. 4 is a cross-sectional view showing an IV-IV position of FIG. 3.

FIG. 2 is an exploded perspective view showing the configuration of the liquid discharge head 510. FIG. 3 is an explanatory diagram showing the configuration of the liquid discharge head 510 in plan view. FIG. 3 shows a configuration around a pressure chamber substrate 10 in the liquid discharge head 510. In FIG. 3, a protective substrate 30 and a case member 40 are omitted for easy understanding of the technique. FIG. 4 is a cross-sectional view showing a IV-IV position of FIG. 3.

As shown in FIG. 2, the liquid discharge head 510 includes a pressure chamber substrate 10, a communication plate 15, a nozzle plate 20, a compliance substrate 45, a protective substrate 30, a case member 40, and a wiring substrate 120. Further, the liquid discharge head 510 includes a piezoelectric element 300 shown in FIG. 3 and a diaphragm 50 shown in FIG. 4. The pressure chamber substrate 10, the communication plate 15, the nozzle plate 20, the compliance substrate 45, the diaphragm 50, the piezoelectric element 300, the protective substrate 30, and the case member 40 are laminated members, and the liquid discharge head 510 is formed by laminating the laminated members. In the present disclosure, a direction in which the laminated members forming the liquid discharge head 510 are laminated is also referred to as a "lamination direction".

The pressure chamber substrate 10 is formed by using, for example, a silicon substrate, a glass substrate, an SOI substrate, various ceramic substrates, and the like. As shown in FIG. 3, a plurality of pressure chambers 12 are arranged in the pressure chamber substrate 10 along a predetermined direction in the pressure chamber substrate 10. The direction in which the plurality of pressure chambers 12 are arranged is also referred to as an "arrangement direction". The pressure chamber 12 is formed in a rectangular shape in which a length in the X-axis direction is longer than a length in the Y-axis direction in plan view. The shape of the pressure chamber 12 is not limited to the rectangular shape, and may be a parallelogram shape, a polygonal shape, a circular shape, an oval shape, or the like. The oval shape referred to here is a shape in which both end portions in a longitudinal direction are semicircular based on a rectangular shape, and includes a rounded rectangular shape, an elliptical shape, an egg shape, and the like.

In the present embodiment, the plurality of pressure chambers 12 are arranged in two rows each having the Y-axis direction as the arrangement direction. In the example of FIG. 3, the pressure chamber substrate 10 is formed with two pressure chamber rows, that is, a first pressure chamber row L1 having the Y-axis direction as the arrangement direction and a second pressure chamber row L2 having the Y-axis direction as the arrangement direction. The second pressure chamber row L2 is disposed to be adjacent to the first pressure chamber row L1 in a direction intersecting the arrangement direction of the first pressure chamber row L1. The direction intersecting the arrangement direction is also referred to as an "intersection direction". In the example of FIG. 3, the intersection direction is the X-axis direction, and the second pressure chamber row L2 is adjacent to the −X direction of the first pressure chamber row L1. The arrangement direction means a macroscopic arrangement direction of the plurality of pressure chambers 12. For example, even when a plurality of pressure chambers 12 are disposed along the Y-axis direction according to a so-called staggered arrangement in which every other pressure chamber 12 is disposed alternately in the intersection direction, the Y-axis direction is included in the arrangement direction.

The plurality of pressure chambers 12 belonging to the first pressure chamber row L1 and the plurality of pressure chambers 12 belonging to the second pressure chamber row L2 are formed to have positions which coincide with each other in the arrangement direction, and are disposed to be adjacent to each other in the intersection direction. In each pressure chamber row, the pressure chambers 12 adjacent to each other in the Y-axis direction are partitioned by a partition wall 11 shown in FIG. 6, as will be described later.

As shown in FIGS. 2 and 4, the communication plate 15, the nozzle plate 20, and the compliance substrate 45 are laminated in this order on the +Z direction side of the pressure chamber substrate 10. The communication plate 15 is, for example, a flat plate member using a silicon substrate, a glass substrate, an SOI substrate, various ceramic substrates, a metal substrate, or the like. Examples of the metal substrate include a stainless steel substrate or the like. The communication plate 15 is provided with a nozzle communication path 16, a first manifold portion 17, a second manifold portion 18, and a supply communication path 19. It is preferable that the communication plate 15 is formed by using a material having a thermal expansion coefficient substantially the same as a thermal expansion coefficient of the pressure chamber substrate 10. As a result, when the temperatures of the pressure chamber substrate 10 and the communication plate 15 change, it is possible to suppress the warp of the pressure chamber substrate 10 and the communication plate 15 due to a difference in the thermal expansion coefficient.

As shown in FIG. 4, the nozzle communication path 16 is a flow path that communicates the pressure chamber 12 and a nozzle 21. The first manifold portion 17 and the second manifold portion 18 function as a part of a manifold 100 which is a common liquid chamber in which a plurality of pressure chambers 12 communicate with each other. The first manifold portion 17 is provided to penetrate the communication plate 15 in the Z-axis direction. Further, as shown in FIG. 4, the second manifold portion 18 is provided on a surface of the communication plate 15 on the +Z direction side without penetrating the communication plate 15 in the Z-axis direction.

The supply communication path 19 is a flow path communicating with one end portion of the pressure chamber 12 in the X-axis direction. A plurality of supply communication paths 19 are disposed side by side in the Y-axis direction. The supply communication paths 19 are individually provided in the pressure chambers 12, respectively. The supply communication path 19 communicates the second manifold portion 18 with each pressure chamber 12, and supplies the ink in the manifold 100 to each pressure chamber 12.

The nozzle plate 20 is provided on a side opposite to the pressure chamber substrate 10, that is, on a surface of the communication plate 15 on the +Z direction side while interposing the communication plate 15 therebetween. The material of the nozzle plate 20 is not particularly limited, and, for example, a silicon substrate, a glass substrate, an SOI substrate, various ceramic substrates, and a metal substrate can be used. Examples of the metal substrate include a stainless steel substrate or the like. As the material of the nozzle plate 20, an organic substance, such as a polyimide resin, can also be used. However, it is preferable that the nozzle plate 20 uses a material substantially the same as the thermal expansion coefficient of the communication plate 15. As a result, when the temperatures of the nozzle plate 20 and the communication plate 15 change, it is possible to suppress the warp of the nozzle plate 20 and the communication plate 15 due to the difference in the thermal expansion coefficient.

A plurality of nozzles 21 are formed on the nozzle plate 20. Each nozzle 21 communicates with each pressure chamber 12 via the nozzle communication path 16. The plurality of nozzles 21 are arranged along the arrangement direction of the pressure chamber 12, that is, the Y-axis direction. The nozzle plate 20 is provided with two nozzle rows in which the plurality of nozzles 21 are arranged in a row. The two nozzle rows correspond to the first pressure chamber row L1 and the second pressure chamber row L2, respectively.

As shown in FIGS. 2 and 4, the compliance substrate 45 is provided on the side opposite to the pressure chamber substrate 10, that is, on the surface of the communication plate 15 on the +Z direction side while interposing the communication plate 15 together with the nozzle plate 20. The compliance substrate 45 is provided around the nozzle plate 20 and covers openings of the first manifold portion 17 and the second manifold portion 18 provided in the communication plate 15. In the present embodiment, the compliance substrate 45 includes a sealing film 46 formed of a flexible thin film and a fixed substrate 47 formed of a hard material such as metal. As shown in FIG. 4, a region of the fixed substrate 47, which faces the manifold 100, is an opening portion 48 completely removed in a thickness direction. Therefore, one surface of the manifold 100 is a compliance portion 49 sealed only by the sealing film 46.

As shown in FIG. 4, the diaphragm 50 and the piezoelectric element 300 are laminated on a side opposite to the nozzle plate 20 or the like, that is, on a surface of the pressure chamber substrate 10 on the −Z direction side while interposing the pressure chamber substrate 10 therebetween. The piezoelectric element 300 bends and deforms the diaphragm 50 to cause a pressure change in the ink in the pressure chamber 12. In FIG. 4, a configuration of the piezoelectric element 300 is simplified and shown for easy understanding of the technique. The diaphragm 50 is provided in the +Z direction of the piezoelectric element 300, and the pressure chamber substrate 10 is provided in the +Z direction of the diaphragm 50.

As shown in FIG. 4, the protective substrate 30 having substantially the same size as the pressure chamber substrate 10 is further bonded to the surface of the pressure chamber substrate 10 on the −Z direction side by an adhesive or the like. The protective substrate 30 has holding portions 31 which are spaces for protecting the piezoelectric elements 300. The holding portions 31 are provided for each row of the piezoelectric elements 300 disposed side by side in the Y-axis direction, and two holding portions 31 are formed side by side in the X-axis direction. Further, the protective substrate 30 is provided with a through hole 32 penetrating in the Z-axis direction between two holding portions 31 disposed side by side in the X-axis direction.

As shown in FIG. 4, the case member 40 is fixed on the protective substrate 30. The case member 40 forms the manifold 100 that communicates with the plurality of pressure chambers 12, together with the communication plate 15. The case member 40 has substantially the same outer shape as the communication plate 15 in plan view, and is bonded to the protective substrate 30 and also bonded to the communication plate 15.

The case member 40 has an accommodation section 41, a supply port 44, a third manifold portion 42, and a coupling port 43. The accommodation section 41 is a space having a depth capable of accommodating the pressure chamber substrate 10 and the protective substrate 30. The third manifold portion 42 is formed in the case member 40 at a position adjacent to both outer sides of the accommodation section 41 in the X-axis direction. The manifold 100 is formed by coupling the third manifold portion 42 to the first manifold portion 17 and the second manifold portion 18 provided in the communication plate 15. The manifold 100 is continuously provided along the Y-axis direction. The supply port 44 communicates with the manifold 100 to supply ink to each manifold 100. The coupling port 43 is a through hole that communicates with the through hole 32 of the protective substrate 30, and the wiring substrate 120 is inserted therethrough.

As shown in FIG. 1, in the liquid discharge head 510 of the present embodiment, the ink supplied from the ink tank 550 shown in FIG. 1 is taken from the supply port 44 shown in FIG. 4, and an internal flow path from the manifold 100 to the nozzle 21 is filled with ink. After that, a voltage based on the drive signal is applied to each of the piezoelectric elements 300 corresponding to the plurality of pressure chambers 12. As a result, the diaphragm 50 bends and deforms together with the piezoelectric element 300, the pressure in each pressure chamber 12 increases, and ink droplets are ejected from each nozzle 21.

Figure 5:
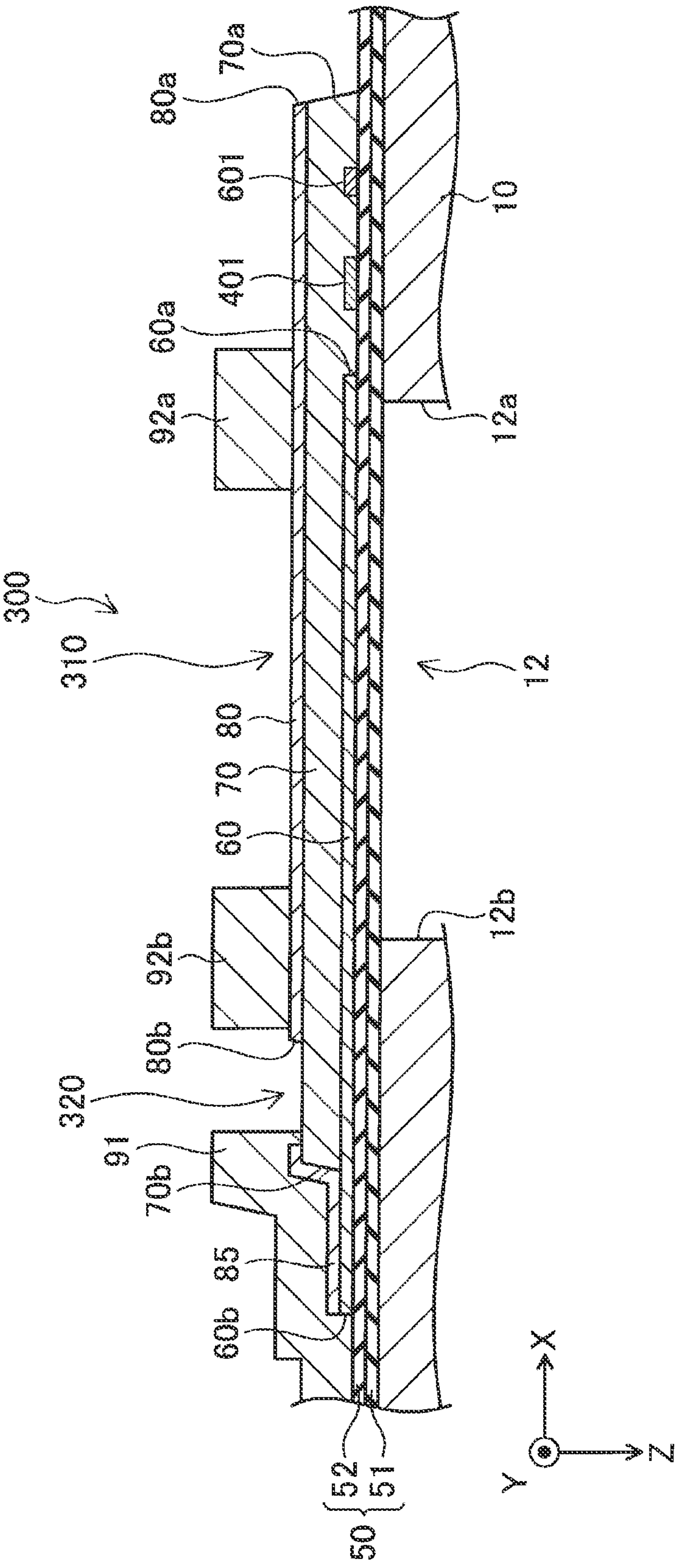
FIG. 5 is an enlarged cross-sectional view showing the vicinity of a piezoelectric element.
Figure 6:
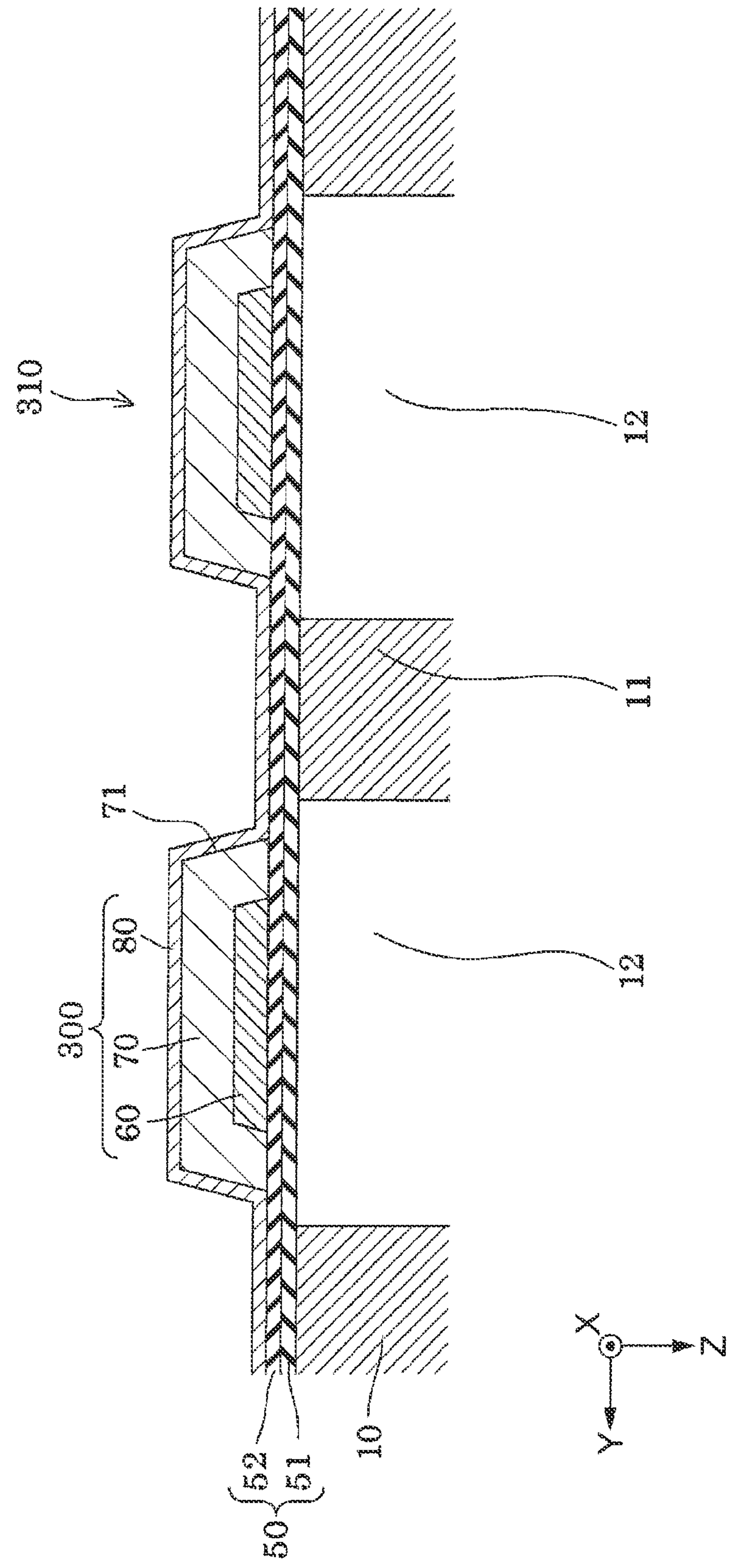
FIG. 6 is a cross-sectional view showing a VI-VI position of FIG. 3.

A configuration of the pressure chamber substrate 10, which includes the diaphragm 50 and the piezoelectric element 300, on the −Z direction side will be described with reference to FIGS. 3 to 6. FIG. 5 is an enlarged cross-sectional view showing the vicinity of the piezoelectric element 300. FIG. 6 is a cross-sectional view showing a VI-VI position of FIG. 3. The liquid discharge head 510 has an individual lead electrode 91, a common lead electrode 92, a measurement lead electrode 93, a detection resistor 401, and a heating resistor 601, in addition to the diaphragm 50 and the piezoelectric element 300 on the −Z direction side of the pressure chamber substrate 10.

As shown in FIGS. 5 and 6, the diaphragm 50 has an elastic film 51 provided on the pressure chamber substrate 10 side and formed of silicon oxide, and an insulator film 52 provided on the elastic film 51 and formed of a zirconium oxide film. A flow path, such as the pressure chamber 12, formed in the pressure chamber substrate 10 is formed by performing anisotropic etching on the pressure chamber substrate 10 from the surface on the +Z direction side, and the surface of the flow path, such as the pressure chamber 12, on the −Z direction side is composed of the elastic film 51. The diaphragm 50 may be composed of, for example, either the elastic film 51 or the insulator film 52, and may further include another film other than the elastic film 51 and the insulator film 52. Examples of the material of the other film include silicon, silicon nitride, and the like.

The piezoelectric element 300 is an example of a piezoelectric actuator that causes a pressure change in the ink in the pressure chamber 12. As shown in FIGS. 5 and 6, the piezoelectric element 300 has a first electrode 60, a piezoelectric body 70, and a second electrode 80. As shown in FIGS. 5 and 6, the first electrode 60, the piezoelectric body 70, and the second electrode 80 are laminated in order from the +Z direction side to the −Z direction side. The piezoelectric body 70 is provided between the first electrode 60 and the second electrode 80 in a lamination direction in which the first electrode 60, the second electrode 80, and the piezoelectric body 70 are laminated, that is, in the Z-axis direction.

Both the first electrode 60 and the second electrode 80 are electrically coupled to the wiring substrate 120. The first electrode 60 and the second electrode 80 apply a voltage corresponding to the drive signal supplied from a head circuit 121 mounted at the wiring substrate 120 to the piezoelectric body 70. A different drive voltage is supplied to the first electrode 60 according to the discharge amount of ink, and a constant holding voltage is supplied to the second electrode 80 regardless of the discharge amount of ink. The discharge amount of ink is a volume change amount required for the pressure chamber 12. When the piezoelectric element 300 is driven and a potential difference is generated between the first electrode 60 and the second electrode 80, the piezoelectric body 70 is deformed. Due to the deformation of the piezoelectric body 70, the diaphragm 50 is deformed or vibrated, so that the volume of the pressure chamber 12 changes. Due to the change in the volume of the pressure chamber 12, pressure is applied to the ink accommodated in the pressure chamber 12, and the ink is discharged from the nozzle 21 via the nozzle communication path 16.

When a voltage is applied between the first electrode 60 and the second electrode 80, a part, at which piezoelectric distortion occurs in the piezoelectric body 70, in the piezoelectric element 300 is also referred to as an active portion 310. On the other hand, a part where the piezoelectric distortion does not occur in the piezoelectric body 70 is referred to as an inactive portion 320. That is, in the piezoelectric element 300, a part where the piezoelectric body 70 is interposed between the first electrode 60 and the second electrode 80 is the active portion 310, and a part where the piezoelectric body 70 is not interposed between the first electrode 60 and the second electrode 80 is the inactive portion 320. When the piezoelectric element 300 is driven, a part that is actually displaced in the Z-axis direction is also referred to as a flexible portion, and a part that is not displaced in the Z direction is also referred to as a non-flexible portion. That is, in the piezoelectric element 300, a part facing the pressure chamber 12 in the Z-axis direction is the flexible portion, and an outer part of the pressure chamber 12 is a non-flexible portion. The active portion 310 is also referred to as a proactive portion, and the inactive portion 320 is also referred to as a passive portion.

For example, the first electrode 60 is formed of a conductive material including a metal, such as platinum (Pt), iridium (Ir), gold (Au), titanium (Ti), and a conductive metal oxide such as indium tin oxide abbreviated as ITO. The first electrode 60 may be formed by laminating a plurality of materials such as platinum (Pt), iridium (Ir), gold (Au), and titanium (Ti). In the present embodiment, platinum (Pt) is used as the first electrode 60.

As shown in FIG. 3, the first electrode 60 is an individual electrode individually provided for the plurality of pressure chambers 12. A width of the first electrode 60 in the Y-axis direction is narrower than a width of the pressure chamber 12. That is, both ends of the first electrode 60 in the Y direction are positioned inside both ends of the pressure chamber 12 in the Y-axis direction. As shown in FIG. 5, in the first electrode 60, an end portion 60*a* in the +X direction and an end portion 60*b* in the −X direction are respectively disposed outside the pressure chamber 12. For example, in the first pressure chamber row, the end portion 60*a* of the first electrode 60 is disposed at a position on the +X direction side with respect to the end portion 12*a* of the pressure chamber 12 in the +X direction. The end portion 60*b* of the first electrode 60 is disposed at a position which is the −X direction side rather than the end portion 12*b* of the pressure chamber 12 in the −X direction.

As shown in FIG. 3, the piezoelectric body 70 has a predetermined width in the X-axis direction, and is provided to extend along the arrangement direction of the pressure chambers 12, that is, the Y-axis direction. Examples of the piezoelectric body 70 include a crystal film having a perovskite structure formed on the first electrode 60 and formed of a ferroelectric ceramic material exhibiting an electromechanical conversion action, that is, a so-called perovskite type crystal. As the material of the piezoelectric body 70, for example, a ferroelectric piezoelectric material such as lead zirconate titanate (PZT) or a material to which a metal oxide, such as niobium oxide, nickel oxide, or magnesium oxide, is added is used. Specifically, lead titanate ($PbTiO3$), lead zirconate titanate (Pb(Zr, Ti)O3), lead zirconium acid (PbZrO3), lead lanthanum titanate ((Pb, La),TiO3), lead lanthanum zirconate titanate ((Pb, La)(Zr, Ti)O3), lead zirconium titanate magnesium niobate (Pb(Zr, Ti)(Mg,Nb)O3), or the like can be used. In the present embodiment, lead zirconate titanate (PZT) is used as the piezoelectric body 70.

The material of the piezoelectric body 70 is not limited to the lead-based piezoelectric material containing lead, and a non-lead-based piezoelectric material containing no lead can also be used. Examples of the non-lead-based piezoelectric material include bismuth iron acid ((BiFeO3), abbreviated as "BFO"), barium titanate ((BaTiO3), abbreviated as "BT"), potassium sodium niobate ((K,Na)(NbO3), abbreviated as "KNN"), potassium sodium lithium niobate ((K,Na, Li)(NbO3)), potassium sodium lithium titanate niobate ((K, Na,Li)(Nb,Ta)O3), bismuth potassium titanate ((Bi½K½) TiO3, abbreviated as "BKT"), bismuth sodium titanate ((Bi½Na½) TiO3, abbreviated as "BNT"), bismuth manganate (BimnO3, abbreviated as "BM"), composite oxide containing bismuth, potassium, titanium and iron and having a perovskite structure (x[(BixK1−x)TiO3]−(1−x)[BiFeO3], abbreviated as "BKT-BF"), composite oxide containing bismuth, iron, barium and titanium and having a perovskite structure ((1−x)[BiFeO3]−x[BaTiO3], abbreviated as "BFO-BT"), and a material ((1−x)[Bi(Fe1−yMy)O3]−x[BaTiO3] (M is Mn, Co or Cr)), which is obtained by adding metals, such as manganese, cobalt, and chromium, to the composite oxide.

The thickness of the piezoelectric body 70 is formed, for example, from approximately 1000 nanometers to 4000 nanometers. As shown in FIG. 5, the width of the piezoelectric body 70 in the X-axis direction is longer than the length in the X-axis direction which is the longitudinal direction of the pressure chamber 12. Therefore, on both sides of the pressure chamber 12 in the X-axis direction, the piezoelectric body 70 extends to the outside of the pressure chamber 12. As described above, the piezoelectric body 70 extends to the outside of the pressure chamber 12 in the X-axis direction, so that the strength of the diaphragm 50 is improved. Therefore, when the active portion 310 is driven to displace the piezoelectric element 300, it is possible to suppress the occurrence of cracks or the like in the diaphragm 50 or the piezoelectric element 300.

As shown in FIG. 5, the end portion 70*a* of the piezoelectric body 70 in the +X direction is positioned on the +X direction side, which is an outer side than the end portion 60*a* of the first electrode 60 in the first pressure chamber row. That is, the end portion 60*a* of the first electrode 60 is covered with the piezoelectric body 70. On the other hand, the end portion 70*b* of the piezoelectric body 70 in the −X direction is positioned on the +X direction side which is the inside rather than the end portion 60*b* of the first electrode 60, and the end portion 60*b* of the first electrode 60 is not covered with the piezoelectric body 70.

As shown in FIGS. 3 and 6, the piezoelectric body 70 is formed with a groove portion 71, which is a part thinner than the other regions. As shown in FIG. 6, the groove portion 71 is provided at a position corresponding to each partition wall 11. The groove portion 71 is formed by completely removing the piezoelectric body 70 in the Z-axis direction. The piezoelectric body 70 may be formed on a bottom surface of the groove portion 71 to be thinner than other parts. The width of the groove portion 71 in the Y-axis direction is formed to be the same as or wider than the width of the partition wall 11 in the Y-axis direction. As shown in FIG. 3, the groove portion 71 has a substantially rectangular appearance shape in plan view. By providing the groove portion 71 in the piezoelectric body 70, the rigidity of a part of the diaphragm 50 facing the end portion of the pressure chamber 12 in the Y-axis direction, that is, a so-called arm portion of the diaphragm 50 is suppressed, so that the piezoelectric element 300 can be displaced better. The groove portion 71 is not limited to the rectangular shape, and may have a polygonal shape of pentagon or more, a circular shape, an elliptical shape, or the like.

As shown in FIGS. 3, 5, and 6, the second electrode 80 is provided on an opposite side of the first electrode 60 while interposing the piezoelectric body 70 therebetween, that is, that is, on the −Z direction side of the piezoelectric body 70. The second electrode 80 is a common electrode that is commonly provided for the plurality of pressure chambers 12 and is common to the plurality of active portions 310. The material of the second electrode 80 is not particularly limited, but, like the first electrode 60, for example, metals, such as platinum (Pt), iridium (Ir), gold (Au), and titanium (Ti), and conductive materials including conductive metal oxides, such as indium tin oxide abbreviated as ITO, are used. Alternatively, a plurality of materials such as platinum (Pt), iridium (Ir), gold (Au), and titanium (Ti) may be laminated and formed. In the present embodiment, iridium (Ir) is used as the second electrode 80.

As shown in FIG. 3, the second electrode 80 has a predetermined width in the X-axis direction, and is provided to extend along the arrangement direction of the pressure chambers 12, that is, the Y-axis direction. As shown in FIG. 6, the second electrode 80 is also provided on the side surface of the groove portion 71 of the piezoelectric body 70 and on the insulator film 52 which is the bottom surface of the groove portion 71.

As shown in FIG. 5, in the first pressure chamber row, the end portion 80*a* of the second electrode 80 in the +X direction is disposed on an outer side of the end portion 60*a* of the first electrode 60 covered with the piezoelectric body 70, that is, on the +X direction side. The end portion 80*a* of the second electrode 80 is positioned on an outer side than the end portion 12*a* of the pressure chamber 12 and an outer side than the end portion 60*a* of the first electrode 60. In the present embodiment, the end portion 80*a* of the second electrode 80 substantially coincides with the end portion 70*a* of the piezoelectric body 70 in the X-axis direction. As a result, at an end portion of the active portion 310 in the +X direction, the boundary between the active portion 310 and the inactive portion 320 is defined by the end portion 60*a* of the first electrode 60.

As shown in FIG. 5, the end portion 80*b* of the second electrode 80 in the −X direction is disposed on the −X direction side, which is an outer side than the end portion 12*b* of the pressure chamber 12 in the −X direction, and is disposed on the +X direction side, which is an inner side than the end portion 70*b* of the piezoelectric body 70. The end portion 70*b* of the piezoelectric body 70 is positioned inside which is the +X direction side with respect to the end portion 60*b* of the first electrode 60. Therefore, the end portion 80*b* of the second electrode 80 is positioned on the piezoelectric body 70 which is on the +X direction side with respect to the end portion 60*b* of the first electrode 60. On the −X direction side of the end portion 80*b* of the second electrode 80, there is a part where a surface of the piezoelectric body 70 is exposed. As described above, the end portion 80*b* of the second electrode 80 is disposed on the +X direction side with respect to the end portion 70*b* of the piezoelectric body 70 and the end portion 60*b* of the first electrode 60. Therefore, at the end portion of the active portion 310 in the −X direction, the boundary between the active portion 310 and the inactive portion 320 is defined by the end portion 80*b* of the second electrode 80.

On the outside of the end portion 80*b* of the second electrode 80, a wiring portion 85 which is in the same layer as the second electrode 80 but is electrically discontinuous with the second electrode 80 is provided. The wiring portion 85 is formed from the vicinity of the end portion 70*b* of the piezoelectric body 70 to the end portion 60*b* of the first electrode 60 in a state of being spaced from the end portion 80*b* of the second electrode 80. The wiring portion 85 is provided for each active portion 310. That is, a plurality of wiring portions 85 are disposed at predetermined intervals along the Y-axis direction. The wiring portion 85 is preferably formed in the same layer as the second electrode 80. As a result, the cost can be reduced by simplifying a manufacturing process of the wiring portion 85. However, the wiring portion 85 may be formed in a layer different from the layer of the second electrode 80.

As shown in FIG. 5, the individual lead electrode 91 is coupled to the first electrode 60 which is an individual electrode, and the common lead electrode 92, which is a common electrode for drive, is electrically coupled to the second electrode 80, which is a common electrode, respectively. The individual lead electrode 91 and the common lead electrode 92 function as drive wirings for applying a voltage for driving the piezoelectric body 70 to the piezoelectric body 70. In the present embodiment, a power supply circuit for supplying electric power to the piezoelectric body 70 via the drive wiring and a power supply circuit for supplying electric power to the heating resistor 601 and the detection resistor 401 are different circuits from each other. In the individual lead electrode 91 and the common lead electrode 92, the flexible wiring substrate 120 is electrically coupled to end portions on a side opposite to end portions coupled to the piezoelectric element 300. The wiring substrate 120 is formed with a plurality of wirings for coupled to the control section 580 and a power supply circuit (not shown). In the present embodiment, the wiring substrate 120 is composed of, for example, a Flexible Printed Circuit (FPC). In addition, the relay substrate 120 may be composed of any flexible substrate, such as Flexible Flat Cable (FFC), instead of FPC.

As shown in FIGS. 3 and 4, the individual lead electrode 91 and the common lead electrode 92 are extended so as to be exposed in the through hole 32 formed at the protective substrate 30, and are electrically coupled to the wiring substrate 120 in the through hole 32. The head circuit 121 having a switching element is mounted at the wiring substrate 120.

The materials of the individual lead electrode 91 and the common lead electrode 92 are conductive materials. For example, gold (Au), copper (Cu), titanium (Ti), tungsten (W), nickel (Ni), chromium (Cr), platinum (Pt), aluminum (Al), and the like can be used. In the present embodiment, gold (Au) is used as the individual lead electrode 91 and the common lead electrode 92. Further, the individual lead electrode 91 and the common lead electrode 92 may have an adhesion layer for improving the adhesion with the first electrode 60, the second electrode 80, and the diaphragm 50.

The individual lead electrode 91 and the common lead electrode 92 are formed in the same layer, but are formed so as to be electrically discontinuous. As a result, the cost can be reduced by simplifying the manufacturing process as compared with a case where the individual lead electrode 91 and the common lead electrode 92 are individually formed. The individual lead electrode 91 and the common lead electrode 92 may be formed in different layers.

The individual lead electrode 91 is provided for each active portion 310, that is, for each first electrode 60. As shown in FIG. 5, for example, the individual lead electrode 91 is coupled to the vicinity of the end portion 60*b* of the first electrode 60 via the wiring portion 85 in the first pressure chamber row L1, and is pulled out in the −X direction up to a top of the diaphragm 50.

As shown in FIG. 3, for example, in the first pressure chamber row L1, the common lead electrode 92 is pulled out in the −X direction from the second electrode 80 to the diaphragm 50 at both end portions in the Y-axis direction. The common lead electrode 92 has an extension portion 92*a* and an extension portion 92*b*. As shown in FIGS. 3 and 5, for example, in the first pressure chamber row, the extension portion 92*a* is extended along the Y-axis direction in a region corresponding to the end portion 12*a* of the pressure chamber 12, and the extension portion 92*b* is extended along the Y-axis direction to a region corresponding to the end portion 12*b* of the pressure chamber 12. The extension portion 92*a* and the extension portion 92*b* are continuously provided with respect to the plurality of active portions 310 in the Y-axis direction.

The extension portion 92*a* and the extension portion 92*b* extend from an inside of the pressure chamber 12 to an outside of the pressure chamber 12 in the X-axis direction. In the present embodiment, the active portion 310 of the piezoelectric element 300 extends to the outside of the pressure chamber 12 at both end portions of the pressure chamber 12 in the X-axis direction, and the extension portion 92*a* and the extension portion 92*b* extend to the outside of the pressure chamber 12 on the active portion 310.

As shown in FIG. 5, a heating resistor 601 is provided on a surface of the diaphragm 50 on the −Z direction side, specifically, on the surface of the diaphragm 50 on the −Z direction side. Specifically, the heating resistor 601 is positioned between the diaphragm 50 and the piezoelectric body 70 in the Z-axis direction, and is covered with the piezoelectric body 70. The heating resistor 601 is a conductor wiring used for heating the inside of the pressure chamber 12. In the present embodiment, the heating resistor 601 heats the liquid in the pressure chamber 12 by utilizing resistance heating generated by causing an electric current to flow through an electric resistor such as a metal or a semiconductor.

Various heating elements can be used as a material of the heating resistor 601. As the heating element, metal heating elements, which include gold (Au), platinum (Pt), iridium (Ir), aluminum (Al), copper (Cu), titanium (Ti), tungsten (W), nickel (Ni), and chromium (Cr) And other metal, can be used. The heating resistor 601 may be formed of a non-metal heating element such as silicon carbide, molybdenum silicide, or carbon. In the present embodiment, the heating resistor 601 is provided at the same position as the first electrode 60 in the lamination direction, that is, in the same layer as the first electrode 60, and is formed so as to be electrically discontinuous with the first electrode 60. The material of the heating resistor 601 is platinum (Pt), which is the same as that of the first electrode 60. As a result, the cost can be reduced by simplifying the manufacturing process as compared with a case where the heating resistor 601 is formed separately from the first electrode 60. The heating resistor 601 may be formed in a layer different from the layer of the first electrode 60.

As shown in FIG. 3, a part of the heating resistor 601 is formed in a linear shape along the first pressure chamber row L1, and is disposed on the +X direction side with respect to the pressure chamber 12 included in the first pressure chamber row L1, that is, outside the liquid discharge head 510 in the intersection direction. In the present embodiment, the other part of the heating resistor 601 is formed in a linear shape along the second pressure chamber row L2, and is disposed on the −X direction side with respect to the pressure chamber 12 included in the second pressure chamber row L2, that is, outside the liquid discharge head 510 in the intersection direction. As described above, in the present embodiment, the heating resistor 601 is continuously formed on an outside of the liquid discharge head 510 so as to surround the periphery of the first pressure chamber row L1 and the second pressure chamber row L2.

FIG. 3 shows a heating lead electrode 94 including a heating lead electrode 94*a* and a heating lead electrode 94*b*. The heating lead electrode 94 functions as a coupling portion that couples the heating resistor 601 and the wiring substrate 120. One end of the heating resistor 601 is coupled to the heating lead electrode 94*a*, and the other end of the heating resistor 601 is coupled to the heating lead electrode 94*b*. As a result, the heating resistor 601 is electrically coupled to the wiring substrate 120, and the control section 580 can detect the electric resistance value of the heating resistor 601. In the example of FIG. 3, the heating resistor 601 is formed in a linear shape, but the shape is not limited thereto. For example, the heating resistor 601 may be formed as a so-called meandering pattern in which the heating resistor 601 reciprocates a plurality of times in the vicinity of the first pressure chamber row L1 and the second pressure chamber row L2. With the configuration, temperature adjustment accuracy of the pressure chamber 12 can be improved.

In the present embodiment, the heating lead electrode 94 is formed in the same layer as the individual lead electrode 91 and the common lead electrode 92, and is formed so as to be electrically discontinuous. The material of the heating lead electrode 94 is a conductive material, and includes, for example, gold (Au), copper (Cu), titanium (Ti), tungsten (W), nickel (Ni), chromium (Cr), platinum (Pt), aluminum (Al), and the like. In the present embodiment, gold (Au) is used as the heating lead electrode 94. The material of the heating lead electrode 94 is the same as the materials of the individual lead electrode 91 and the common lead electrode 92. The heating lead electrode 94 may have an adhesion layer that improves adhesion to the heating resistor 601 and the diaphragm 50.

As shown in FIG. 5, in the present embodiment, the detection resistor 401 is further provided on the surface of the diaphragm 50 on the −Z direction side. Specifically, the detection resistor 401 is positioned between the diaphragm 50 and the piezoelectric body 70 in the Z-axis direction, and is covered with the piezoelectric body 70. The detection resistor 401 is a conductor wiring used for detecting the temperature of the pressure chamber 12. In the present embodiment, the detection resistor 401 detects the temperature by utilizing the characteristic that the electric resistance value of a metal, a semiconductor, or the like changes depending on the temperature. When driving the piezoelectric element 300, the control section 580 measures the electric resistance value of the detection resistor 401, and detects the temperature of the pressure chamber 12 based on the correspondence relationship between the electric resistance value of the detection resistor 401 and the temperature.

The material of the detection resistor 401 is a material whose electric resistance value is temperature dependent. For example, gold (Au), platinum (Pt), iridium (Ir), aluminum (Al), copper (Cu), titanium (Ti), tungsten (W), nickel (Ni), chromium (Cr), and the like can be used. Here, platinum (Pt) can be preferably used as a material for the detection resistor 401 from a viewpoint that the change in electric resistance with temperature is large and stability and accuracy are high. The electric resistance value is an example of a measured value of the detection resistor to be measured. In the present embodiment, the detection resistor 401 is in the same layer as the heating resistor 601 and the first electrode 60 in the lamination direction, and is formed so as to be electrically discontinuous with the heating resistor 601 and the first electrode 60. The material of the detection resistor 401 is the same platinum (Pt) as the heating resistor 601 and the first electrode 60. As a result, the cost can be reduced by simplifying the manufacturing process as compared with a case where the detection resistor 401 is formed separately from the heating resistor 601 and the first electrode 60. The detection resistor 401 may be formed in a layer different from the layers of the heating resistor 601 and the first electrode 60.

As shown in FIG. 3, in the present embodiment, the detection resistor 401 is continuously formed so as to surround the periphery of the first pressure chamber row L1 and the second pressure chamber row L2. FIG. 3 shows a measurement lead electrode 93 including a measurement lead electrode 93*a* and a measurement lead electrode 93*b*. The measurement lead electrode 93 functions as a coupling portion that couples the detection resistor 401 and the wiring substrate 120. One end of the detection resistor 401 is coupled to the measurement lead electrode 93*a*, and the other end of the detection resistor 401 is coupled to the measurement lead electrode 93*b*. As a result, the detection resistor 401 is electrically coupled to the wiring substrate 120, and the control section 580 can detect the electric resistance value of the detection resistor 401. In the example of FIG. 3, the detection resistor 401 is formed in a linear shape, but is not limited thereto, and, for example, may be formed as a so-called meandering pattern in which the detection resistor 401 reciprocates a plurality of times in the vicinity of the first pressure chamber row L1 and the second pressure chamber row L2. With the configuration, the temperature detection accuracy of the pressure chamber 12 can be improved.

In the present embodiment, the measurement lead electrode 93 is formed in the same layer as the individual lead electrode 91 and the common lead electrode 92, and is formed to be electrically discontinuous. The material of the measurement lead electrode 93 is a conductive material, and includes, for example, gold (Au), copper (Cu), titanium (Ti), tungsten (W), nickel (Ni), chromium (Cr), platinum (Pt), aluminum (Al), and the like. In the present embodiment, gold (Au) is used as the measurement lead electrode 93. The material of the measurement lead electrode 93 is the same as the materials of the individual lead electrode 91 and the common lead electrode 92. The measurement lead electrode 93 may have an adhesion layer that improves adhesion to the detection resistor 401 and the diaphragm 50.

As shown in FIG. 3, a part of the detection resistor 401 is formed in a linear shape along the arrangement direction of the pressure chambers 12 in the first pressure chamber row L1, and is disposed on the +X direction side rather than the pressure chambers 12 included in the first pressure chamber row L1, that is, on an outer side of the liquid discharge head 510 in the intersection direction. In the present embodiment, the other part of the detection resistor 401 is formed in a linear shape along the arrangement direction of the pressure chambers 12 in the second pressure chamber row L2, and is disposed on the −X direction side rather than the pressure chambers 12 included in the second pressure chamber row L2, that is, on an outer side of the liquid discharge head 510 in the intersection direction. As described above, in the present embodiment, the detection resistor 401 is continuously formed on the outside of the liquid discharge head 510 so as to surround the periphery of the first pressure chamber row L1 and the second pressure chamber row L2. The detection resistor 401 is disposed on an inner side of the liquid discharge head 510 rather than the heating resistor 601. By disposing the detection resistor 401 at a position close to the pressure chamber 12, the detection of the temperature of the pressure chamber 12 by the detection resistor 401 is prioritized over temperature adjustment of the pressure chamber 12 by the heating resistor 601, so that the temperature detection accuracy of the pressure chamber 12 can be improved. The configuration is particularly effective because, when the liquid discharge head 510 includes the detection resistor 401 and the heating resistor 601 in the same layer, the detection resistor 401 and the heating resistor 601 need to be efficiently disposed.

As shown in FIG. 3, the heating resistor 601 is disposed on an outer side of the liquid discharge head 510 rather than the detection resistor 401 so as to surround the detection resistor 401. A wiring length of the heating resistor 601 coupling the heating lead electrode 94*a* to the heating lead electrode 94*b* is longer than a wiring length of the detection resistor 401 coupling the measurement lead electrode 93*a* to the measurement lead electrode 93*b*. As a result, the electric resistance of the heating resistor 601 is larger than the electric resistance of the detection resistor 401, and the resistance heating of the heating resistor 601 can be used for more efficient heating.

As shown in FIG. 5, in the present embodiment, the thicknesses of the heating resistor 601 and the thicknesses of the detection resistor 401 are the same, whereas the width of the heating resistor 601 in the X-axis direction is formed to be smaller than the width of the detection resistor 401 in the X-axis direction. That is, in the present embodiment, the cross-sectional area of the heating resistor 601 is smaller than the cross-sectional area of the detection resistor 401. As a result, the electric resistance of the heating resistor 601 is larger than the electric resistance of the detection resistor 401, and the resistance heating of the heating resistor 601 can be used for more efficient heating. The configuration is particularly effective because, when the liquid discharge head 510 includes the detection resistor 401 and the heating resistor 601 in the same layer, the detection resistor 401 and the heating resistor 601 need to be efficiently disposed.

As described above, according to the liquid discharge head 510 according to the first embodiment and the liquid discharge device 500 according to the first embodiment, the following effects can be obtained.

According to the liquid discharge head 510 of the present embodiment includes the pressure chamber substrate 10 that has a plurality of pressure chambers 12, the piezoelectric element 300 that is laminated at the pressure chamber substrate 10 and has the first electrode 60 which is an individual electrode, the second electrode 80 which is a common electrode, and the piezoelectric body 70 for applying pressure to the liquid in the pressure chamber 12, the individual lead electrode 91 and the common lead electrode 92, which function as a drive wiring for applying a voltage for driving the piezoelectric body 70 to the piezoelectric body 70, and the heating resistor 601 for heating the liquid in the pressure chamber 12. The heating resistor 601 is formed of platinum (Pt), which is the same material as the first electrode 60 that is an individual electrode. According to the liquid discharge head 510 of the present embodiment, the heating resistor 601 for heating the liquid in the pressure chamber 12 is provided inside the liquid discharge head 510. For example, when the heating resistor is provided outside the liquid discharge head 510, the heat generated from the heating resistor diffuses, so that there is a problem that thermal transfer efficiency decreases as compared with a case where the heating resistor is provided inside the liquid discharge head 510. In this case, there is a problem that the liquid discharge device 500 cannot perform discharge control suitable for the temperature of the ink in the pressure chamber 12. In the present embodiment, the heating resistor 601 is provided to be laminated on the diaphragm 50 which is a component of the liquid discharge head 510. That is, the heating resistor 601 is provided inside the liquid discharge head 510. As a result, the liquid discharge head 510 can improve the thermal transfer efficiency as compared with a case where the ink is heated from the outside of the liquid discharge head 510. As a result, the liquid discharge device 500 easily performs the discharge control suitable for the temperature of the ink in the pressure chamber 12 on the liquid discharge head 510. According to the liquid discharge head 510 of the present embodiment, it is possible to shorten a distance between the pressure chamber 12 and the heating resistor 601 as compared with a liquid discharge head provided with the heater externally, and it is possible to adjust the temperature of the ink in the pressure chamber 12. Further, by providing the heating resistor 601 inside the liquid discharge head 510, it is possible to suppress a size of the liquid discharge head 510 from being increased.

According to the liquid discharge head 510 of the present embodiment, the heating resistor 601 is disposed at the same position as the first electrode 60, which is an individual electrode in the lamination direction, that is, in the same layer as the first electrode 60. Therefore, the heating resistor 601 can be formed in the same process as a process of forming the first electrode 60.

According to the liquid discharge head 510 of the present embodiment, the heating resistor 601 is disposed on an outer side than the pressure chamber 12 in the liquid discharge head 510 in the intersection direction. The heat dissipation from the pressure chamber 12 to the outside of the liquid discharge head 510 can be reduced, and the temperature of the ink in the pressure chamber 12 can be efficiently adjusted.

The liquid discharge head 510 of the present embodiment includes the detection resistor 401 for detecting the temperature in the pressure chamber 12 and the detection resistor 401 formed of the same material as the first electrode 60 which is an individual electrode. For example, when the detection resistor is provided outside the liquid discharge head 510, the distance from the pressure chamber 12 is long, so that there is a problem that the difference between the temperature measured by the detection resistor and the temperature inside the pressure chamber 12 is large as compared with a case where the detection resistor is provided inside the liquid discharge head 510. In this case, there is a problem that the liquid discharge device 500 cannot perform discharge control suitable for the temperature of the ink in the pressure chamber 12. In the present embodiment, the detection resistor 401 is provided to be laminated on the diaphragm 50 which is a component of the liquid discharge head 510. That is, the detection resistor 401 is provided in the liquid discharge head 510. As a result, the liquid discharge head 510 can reduce the difference between the temperature detected by the detection resistor 401 and the temperature in the pressure chamber 12 as compared with a case where the temperature is measured outside the liquid discharge head 510. The liquid discharge device 500 can easily perform the discharge control of the liquid discharge head 510, which is suitable for the temperature of the ink in the pressure chamber 12.

According to the liquid discharge head 510 of the present embodiment, the heating resistor 601 is disposed on an outer side than the detection resistor 401 in the liquid discharge head 510. By disposing the detection resistor 401 at a position close to the pressure chamber 12, the detection of the temperature of the pressure chamber 12 by the detection resistor 401 is prioritized over temperature adjustment of the pressure chamber 12 by the heating resistor 601, so that the temperature detection accuracy of the pressure chamber 12 can be improved. The configuration is particularly effective because, when the liquid discharge head 510 includes the detection resistor 401 and the heating resistor 601 in the same layer, the detection resistor 401 and the heating resistor 601 need to be efficiently disposed.

According to the liquid discharge head 510 of the present embodiment, the cross-sectional area of the heating resistor 601 is smaller than the cross-sectional area of the detection resistor 401. As a result, the electric resistance of the heating resistor 601 is larger than the electric resistance of the detection resistor 401, and the resistance heating of the heating resistor 601 can be used for more efficient heating. The configuration is particularly effective because, when the liquid discharge head 510 includes the detection resistor 401 and the heating resistor 601 in the same layer, the detection resistor 401 and the heating resistor 601 need to be efficiently disposed.

According to the liquid discharge head 510 of the present embodiment, the length of the heating resistor 601 is longer than the length of the detection resistor 401. As a result, the electric resistance of the heating resistor 601 is larger than the electric resistance of the detection resistor 401, and the resistance heating of the heating resistor 601 can be used for more efficient heating.

According to the liquid discharge head 510 of the present embodiment, the power supply circuit for supplying electric power to the piezoelectric body 70 via the drive wiring and the power supply circuit for supplying electric power to the heating resistor 601 and the detection resistor 401 are different circuits from each other. Therefore, it is possible to individually execute each of the drive control of the piezoelectric element 300, the heating of the liquid in the pressure chamber 12 by the heating resistor 601, and the temperature detection of the pressure chamber 12 by the detection resistor 401.

The liquid discharge device 500 includes the liquid discharge head 510 and the control section 580 that controls a discharge operation of ink from the liquid discharge head 510. According to this, it is possible to easily realize a configuration which is capable of controlling the discharge operation of the liquid discharge head 510.

B. Second Embodiment

Figure 7:
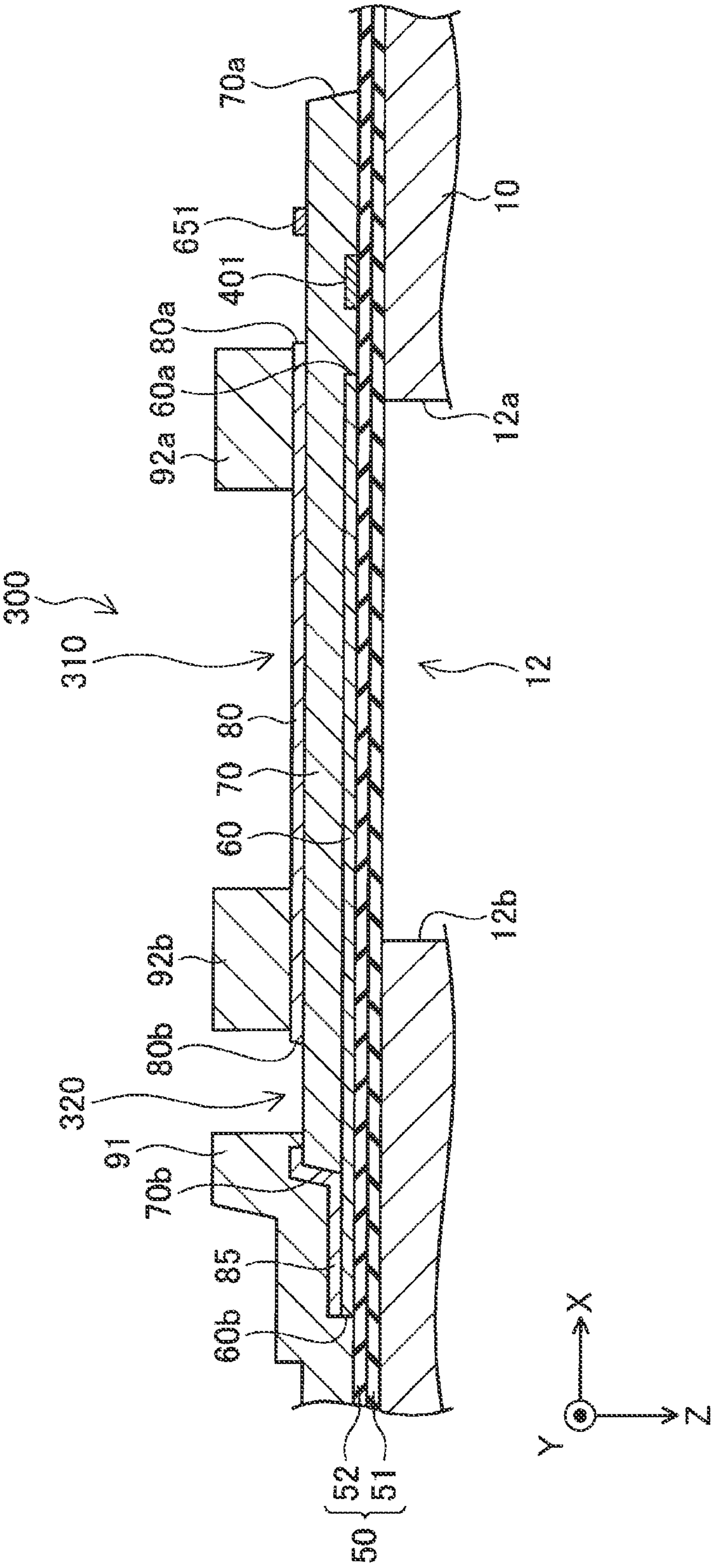
FIG. 7 is an explanatory diagram showing a liquid discharge head according to a second embodiment.

A heating resistor 651 included in a liquid discharge head 510 of a second embodiment as an embodiment of the present disclosure will be described with reference to FIG. 7. FIG. 7 is an explanatory diagram showing the liquid discharge head according to the second embodiment. Parts common to the liquid discharge head 510 of the first embodiment are designated by the same reference numerals, and the description thereof will not be repeated.

In the first embodiment, an example is shown in which the heating resistor 601 is formed in the same layer as the first electrode 60 and is formed on the surface of the diaphragm 50 on the −Z direction side so as to be electrically discontinuous with the first electrode 60. On the other hand, in the present embodiment, as shown in FIG. 7, the heating resistor 651 is different from the first embodiment in a fact that the heating resistor 651 is provided on the surface of the piezoelectric body 70 on the −Z direction side. More specifically, the heating resistor 651 is formed in the same layer as the second electrode 80, together with the second electrode 80 which is the common electrode, and is formed on the surface of the piezoelectric body 70 on the −Z direction side so as to be electrically discontinuous with the second electrode 80. As a result, the cost can be reduced by simplifying a manufacturing process as compared with a case where the heating resistor 651 is formed separately from the second electrode 80.

In the present embodiment, the detection resistor 401 is formed in the same layer as the first electrode 60 together with the first electrode 60 which is an individual electrode, as the same as in the first embodiment. The material of the detection resistor 401 is platinum (Pt), which is the same as the material of the first electrode 60. The second electrode 80 is iridium (Ir) and is formed of a material having a higher electric resistance than the first electrode 60 which is the individual electrode. The first electrode 60 is formed of a material having a larger rate of change in electric resistance with respect to a temperature change than the second electrode 80 which is a common electrode.

According to the liquid discharge head 510 of the present embodiment, the second electrode 80 is iridium (Ir) and is formed of a material having a higher electric resistance than the first electrode 60 which is an individual electrode. On the other hand, the first electrode 60 is platinum (Pt) and is formed of a material having a larger rate of change in electric resistance with respect to the temperature change than the second electrode 80 which is the common electrode. Therefore, it is possible to apply a material suitable for the heating resistor 651 using resistance heating, and it is possible to apply a material suitable for the detection resistor 401 using the temperature change in the electric resistance value to the detection resistor 401. Since the heating resistor 651 is formed of the same material as the second electrode 80 which is the common electrode, it is easy to form the heating resistor 651 in the same process as the second electrode 80 when the heating resistor 651 is formed.

According to the liquid discharge head 510 of the present embodiment, the detection resistor 401 is formed of the same material as the first electrode 60 which is an individual electrode. Therefore, it is easy to form the detection resistor 401 in the same process as the first electrode 60 when the detection resistor 401 is formed.

C. Third Embodiment

Figure 8:
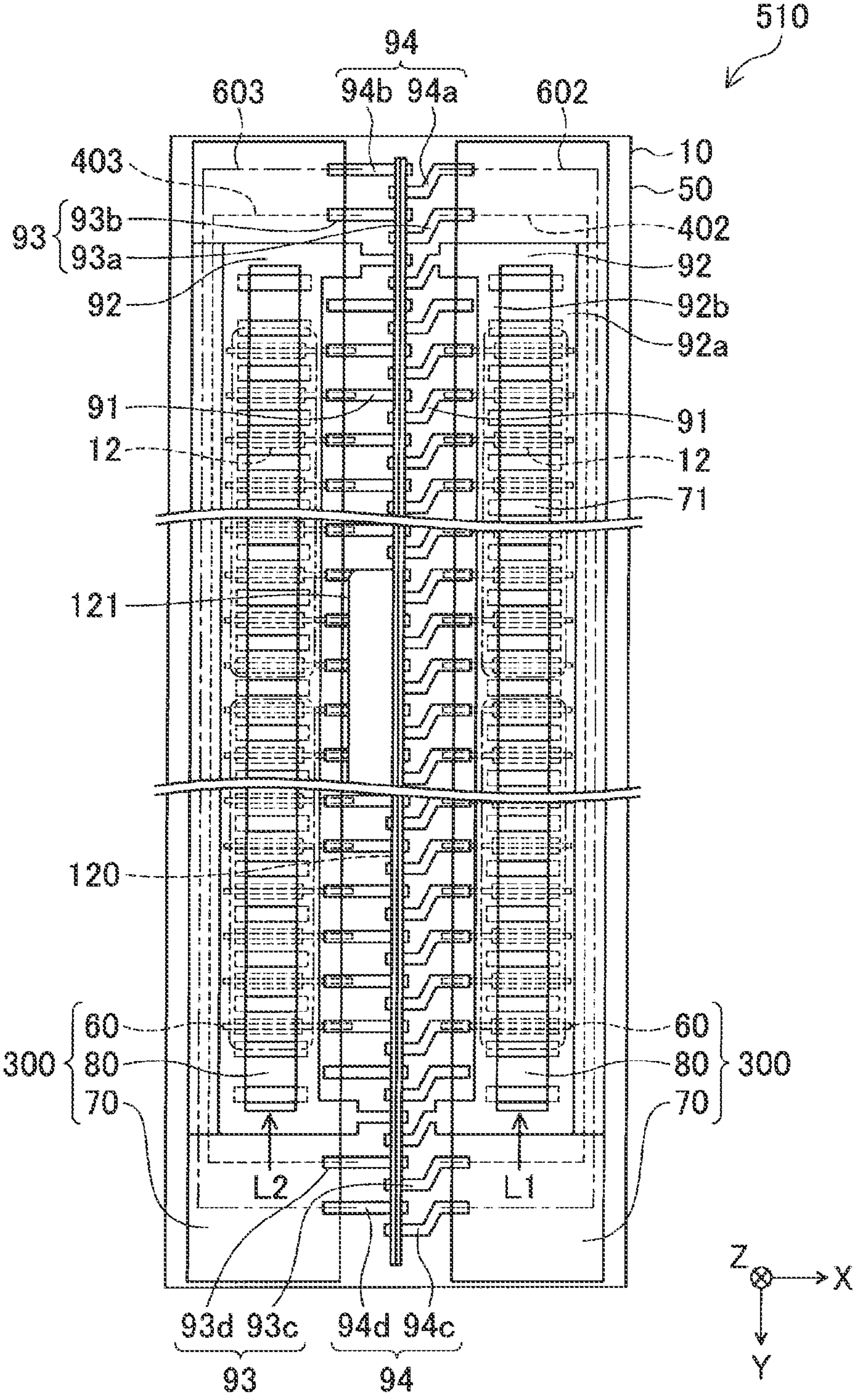
FIG. 8 is a plan view showing a liquid discharge head according to a third embodiment.

A detection resistor and a heating resistor included in a liquid discharge head 510 of a third embodiment as an embodiment of the present disclosure will be described with reference to FIG. 8. FIG. 8 is a plan view showing the liquid discharge head according to the third embodiment. Parts common to the liquid discharge head 510 of the first embodiment are designated by the same reference numerals, and the description thereof will not be repeated.

In the first embodiment, an example is shown in which the detection resistor 401 and the heating resistor 601 are continuously formed on an outer side of the liquid discharge head 510 so as to surround peripheries of the first pressure chamber row L1 and the second pressure chamber row L2.

On the other hand, the liquid discharge head 510 of the present embodiment is different from the first embodiment in that the detection resistor and the heating resistor include a plurality of detection resistors and heating resistors corresponding to each of the plurality of pressure chamber rows, as shown in FIG. 8. According to this, the liquid discharge head 510 can detect the temperature of the plurality of pressure chambers 12 by performing division into a plurality of pressure chamber rows, and can heat the liquid in the plurality of pressure chambers 12 by performing division into a plurality of pressure chamber rows. The configuration is not limited to both the detection resistor and the heating resistor, and only one of them may be provided.

As shown in FIG. 8, the liquid discharge head 510 includes a first detection resistor 402 and a first heating resistor 602. The first detection resistor 402 is disposed on an outer side than the first pressure chamber row L1 in the liquid discharge head 510, and is disposed along the Y-axis direction which is the arrangement direction of each pressure chamber 12 included in the first pressure chamber row L1. The first heating resistor 602 is disposed on an outer side than the first detection resistor 402 in the liquid discharge head 510, and is disposed along the Y-axis direction which is the arrangement direction of each pressure chamber 12 included in the first pressure chamber row L1. The first detection resistor 402 detects the temperature of the ink in the pressure chamber 12 included in the first pressure chamber row L1, and the first heating resistor 602 heats the ink in the pressure chamber 12 included in the first pressure chamber row L1. Further, as shown in FIG. 8, the liquid discharge head 510 includes a second detection resistor 403 and a second heating resistor 603. The second detection resistor 403 is disposed on an outer side than the second pressure chamber row L2 in the liquid discharge head 510, and is disposed along the Y-axis direction which is the arrangement direction of each pressure chamber 12 included in the second pressure chamber row L2. The second heating resistor 603 is disposed on an outer side than the second detection resistor 403 in the liquid discharge head 510, and is disposed along the Y-axis direction which is the arrangement direction of each pressure chamber 12 included in the second pressure chamber row L2. The second detection resistor 403 detects the temperature of the ink in the pressure chamber 12 included in the second pressure chamber row L2, and the second heating resistor 603 heats the ink in the pressure chamber 12 included in the second pressure chamber row L2. A measurement lead electrode 93 further includes a measurement lead electrode 93*c* and a measurement lead electrode 93*d* in addition to the measurement lead electrode 93*a* and the measurement lead electrode 93*b*. A heating lead electrode 94 further includes a heating lead electrode 94*c* and a heating lead electrode 94*d* in addition to the heating lead electrode 94*a* and the heating lead electrode 94*b*.

The first heating resistor 602 is continuous, one end of the first heating resistor 602 is coupled to the heating lead electrode 94*a*, and the other end of the first heating resistor 602 is coupled to the heating lead electrode 94*c*. The second heating resistor 603 is continuous, one end of the second heating resistor 603 is coupled to the heating lead electrode 94*b*, and the other end of the second heating resistor 603 is coupled to the heating lead electrode 94*d*. As a result, the first heating resistor 602 is electrically coupled to the wiring substrate 120, and the control section 580 can apply a voltage to the first heating resistor 602. Further, the second heating resistor 603 is electrically coupled to the wiring substrate 120, and the control section 580 can apply a voltage to the second heating resistor 603.

The first detection resistor 402 is continuous, one end of the first detection resistor 402 is coupled to the measurement lead electrode 93*a*, and the other end of the first detection resistor 402 is coupled to the measurement lead electrode 93*c*. The second detection resistor 403 is continuous, one end of the second detection resistor 403 is coupled to the measurement lead electrode 93*b*, and the other end of the second detection resistor 403 is coupled to the measurement lead electrode 93*d*. As a result, the first detection resistor 402 is electrically coupled to the wiring substrate 120, so that the control section 580 can measure an electric resistance value of the first detection resistor 402. Further, the second detection resistor 403 is electrically coupled to the wiring substrate 120, so that the control section 580 can measure an electric resistance value of the second detection resistor 403.

According to the liquid discharge head 510 of the present embodiment, it is possible to perform temperature adjustment by individually heating the temperature of the ink in the pressure chamber 12 included in the first pressure chamber row L1 and the temperature of the ink in the pressure chamber 12 included in the second pressure chamber row L2. Even when the temperature of the ink differs for each pressure chamber row, the temperature of the ink can be individually adjusted to an appropriate temperature. The liquid discharge device 500 is easier to perform the discharge control of the liquid discharge head 510, which is suitable for the temperature of the ink in the pressure chamber 12.

According to the liquid discharge head 510 of the present embodiment, when the temperature of the ink in the pressure chamber 12 included in the first pressure chamber row L1 and the temperature of the ink in the pressure chamber 12 constituting the second pressure chamber row L2 are different from each other, it is possible to drive the piezoelectric element 300 corresponding to the temperature of the ink in the pressure chamber 12 constituting each pressure chamber row. Further, according to this, the liquid discharge device 500 is easier to perform the discharge control of the liquid discharge head 510, which is suitable for the temperature of the ink in the pressure chamber 12.

D. Fourth Embodiment

Figure 9:
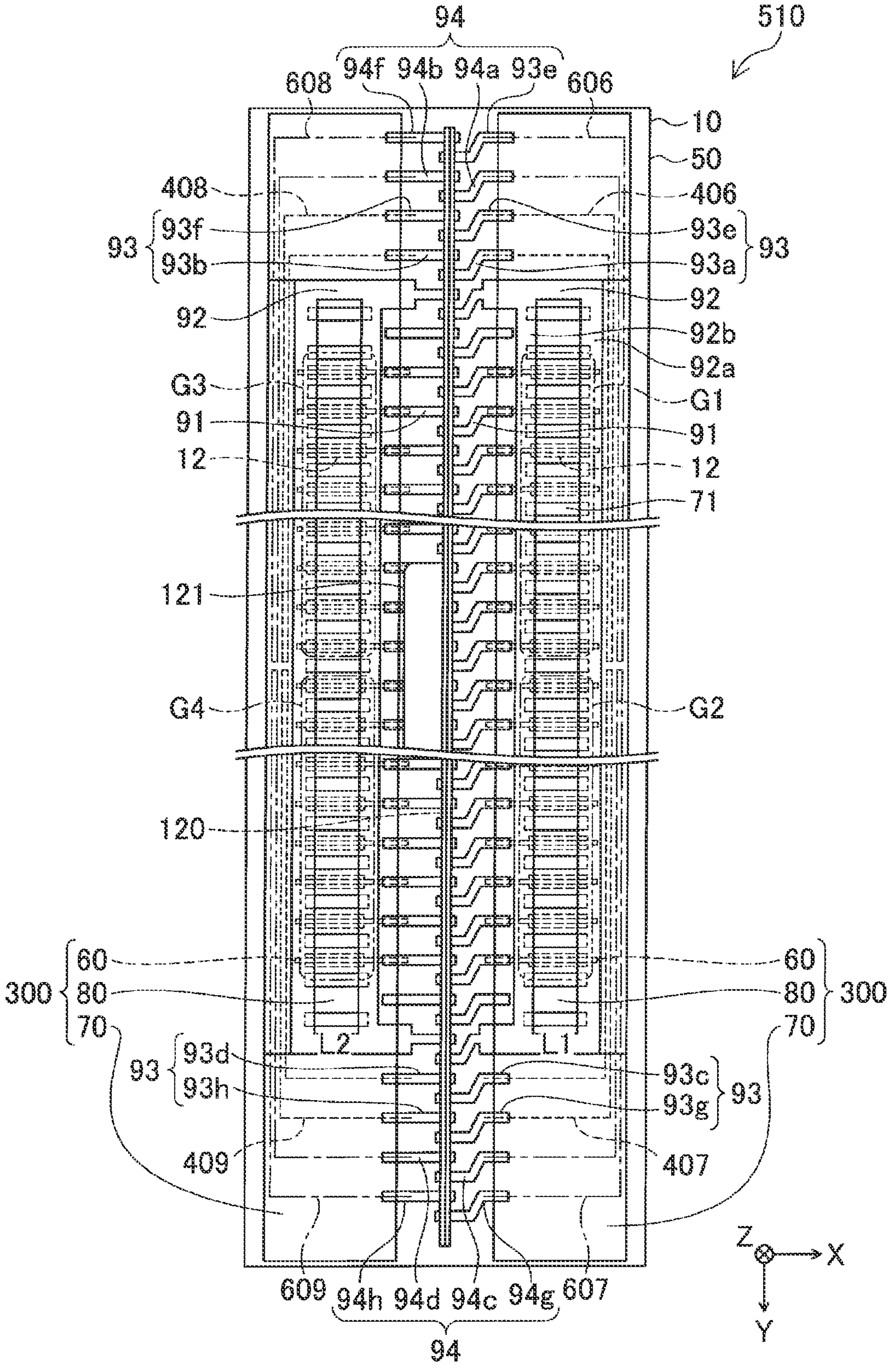
FIG. 9 is a plan view showing a liquid discharge head according to a fourth embodiment.

A detection resistor and a heating resistor included in a liquid discharge head 510 of a fourth embodiment as an embodiment of the present disclosure will be described with reference to FIG. 9. FIG. 9 is a plan view showing a liquid discharge head according to the fourth embodiment. Parts common to the liquid discharge head 510 of the first embodiment are designated by the same reference numerals, and the description thereof will not be repeated.

In the first embodiment, an example is shown in which the detection resistor 401 and the heating resistor 601 are continuously formed on an outer side of the liquid discharge head 510 so as to surround peripheries of the first pressure chamber row L1 and the second pressure chamber row L2. On the other hand, the liquid discharge head 510 of the present embodiment is different from the first embodiment in that the detection resistor and the heating resistor include a plurality of detection resistors and heating resistors corresponding to each of the plurality of pressure chamber groups, as shown in FIG. 9. According to this, the liquid discharge head 510 can detect the temperature of the plurality of pressure chambers 12 by performing division into a plurality of pressure chamber groups, and can heat the liquid in the plurality of pressure chambers 12 by performing division into a plurality of pressure chamber groups. The configuration is not limited to both the detection resistor and the heating resistor, and only one of them may be provided.

As shown in FIG. 9, in a Y-axis direction which is an arrangement direction of a first pressure chamber row L1, a pressure chamber group including a plurality of pressure chambers 12 positioned on a −Y direction side as one side from a center is referred to as a first pressure chamber group G1, and a pressure chamber group including a plurality of pressure chambers 12 positioned on a +Y direction side as the other side from the center is referred to as a second pressure chamber group G2. In a Y-axis direction, which is an arrangement direction of a second pressure chamber row L2, a pressure chamber group including a plurality of pressure chambers 12 positioned on the −Y direction side as one side from the center is referred to as a third pressure chamber group G3, and a pressure chamber group including a plurality of pressure chambers 12 positioned on the +Y direction side as the other side from the center is referred to as a fourth pressure chamber group G4.

As shown in FIG. 9, the liquid discharge head 510 includes a third detection resistor 406 disposed along the Y-axis direction, which is an arrangement direction of each pressure chamber 12 included in the first pressure chamber group G1, on an outer side than the first pressure chamber group G1 in the liquid discharge head 510, and a third heating resistor 606 disposed along the Y-axis direction, which is the arrangement direction of each pressure chamber 12 included in the first pressure chamber group G1, on an outer side than the third detection resistor 406 in the liquid discharge head 510. The third detection resistor 406 detects the temperature of the ink in the pressure chamber 12 included in the first pressure chamber group G1, and the third heating resistor 606 heats the ink in the pressure chamber 12 included in the first pressure chamber group G1.

The liquid discharge head 510 includes a fourth detection resistor 407 disposed along the Y-axis direction, which is the arrangement direction of each pressure chamber 12 included in the second pressure chamber group G2, on an outer side than the second pressure chamber group G2 in the liquid discharge head 510, and a fourth heating resistor 607 disposed along the Y-axis direction, which is the arrangement direction of each pressure chamber 12 included in the second pressure chamber group G2, on an outer side than the fourth detection resistor 407 in the liquid discharge head 510. The fourth detection resistor 407 detects the temperature of the ink in the pressure chamber 12 included in the second pressure chamber group G2, and the fourth heating resistor 607 heats the ink in the pressure chamber 12 included in the second pressure chamber group G2.

The liquid discharge head 510 includes a fifth detection resistor 408 disposed along the Y-axis direction, which is the arrangement direction of each pressure chamber 12 included in the third pressure chamber group G3, on an outer side than the third pressure chamber group G3 in the liquid discharge head 510, and a fifth heating resistor 608 disposed along the Y-axis direction, which is the arrangement direction of each pressure chamber 12 included in the third pressure chamber group G3, on an outer side than the fifth detection resistor 408 in the liquid discharge head 510. The fifth detection resistor 408 detects the temperature of the ink in the pressure chamber 12 included in the third pressure chamber group G3, and the fifth heating resistor 608 heats the ink in the pressure chamber 12 included in the third pressure chamber group G3.

The liquid discharge head 510 includes a sixth detection resistor 409 disposed along the Y-axis direction, which is the arrangement direction of each pressure chamber 12 included in the fourth pressure chamber group G4, on an outer side than the fourth pressure chamber group G4 in the liquid discharge head 510, and a sixth heating resistor 609 disposed along the Y-axis direction, which is the arrangement direction of each pressure chamber 12 included in the fourth pressure chamber group G4, on an outer side than the sixth detection resistor 409 in the liquid discharge head 510. The sixth detection resistor 409 detects the temperature of the ink in the pressure chamber 12 included in the fourth pressure chamber group G4, and the sixth heating resistor 609 heats the ink in the pressure chamber 12 included in the fourth pressure chamber group G4.

The measurement lead electrode 93 further includes measurement lead electrodes 93*c*, 93*d*, 93*e*, 93*f*, 93*g*, and 93*h* in addition to the measurement lead electrode 93*a* and the measurement lead electrode 93*b*. The heating lead electrode 94 further includes heating lead electrodes 94*c*, 94*d*, 94*e*, 94*f*, 94*g*, and 94*h* in addition to the heating lead electrode 94*a* and the heating lead electrode 94*b*.

The third heating resistor 606 is continuous, one end of the third heating resistor 606 is coupled to the heating lead electrode 94*e*, and the other end of the third heating resistor 606 is coupled to the heating lead electrode 94*a*. The fourth heating resistor 607 is continuous, one end of the fourth heating resistor 607 is coupled to the heating lead electrode 94*c*, and the other end of the fourth heating resistor 607 is coupled to the heating lead electrode 94*g*. The fifth heating resistor 608 is continuous, one end of the fifth heating resistor 608 is coupled to the heating lead electrode 94*f*, and the other end of the fifth heating resistor 608 is coupled to the heating lead electrode 94*b*. The sixth heating resistor 609 is continuous, one end of the sixth heating resistor 609 is coupled to the heating lead electrode 94*d*, and the other end of the sixth heating resistor 609 is coupled to the heating lead electrode 94*h*. As a result, the third heating resistor 606 is coupled to the wiring substrate 120, and the control section 580 can apply a voltage to the third heating resistor 606. The fourth heating resistor 607 is coupled to the wiring substrate 120, and the control section 580 can apply a voltage to the fourth heating resistor 607. The fifth heating resistor 608 is coupled to the wiring substrate 120, and the control section 580 can apply a voltage to the fifth heating resistor 608. The sixth heating resistor 609 is coupled to the wiring substrate 120, and the control section 580 can apply a voltage to the sixth heating resistor 609.

The third detection resistor 406 is continuous, one end of the third detection resistor 406 is coupled to the measurement lead electrode 93*e*, and the other end of the third detection resistor 406 is coupled to the measurement lead electrode 93*a*. The fourth detection resistor 407 is continuous, one end of the fourth detection resistor 407 is coupled to the measurement lead electrode 93*c*, and the other end of the fourth detection resistor 407 is coupled to the measurement lead electrode 93*g*. The fifth detection resistor 408 is continuous, one end of the fifth detection resistor 408 is coupled to the measurement lead electrode 93*f*, and the other end of the fifth detection resistor 408 is coupled to the measurement lead electrode 93*b*. The sixth detection resistor 409 is continuous, one end of the sixth detection resistor 409 is coupled to the measurement lead electrode 93*d*, and the other end of the sixth detection resistor 409 is coupled to the measurement lead electrode 93*h*. As a result, the third detection resistor 406 is coupled to the wiring substrate 120, and the control section 580 can measure the electric resistance value of the third detection resistor 406. The fourth detection resistor 407 is coupled to the wiring substrate 120, and the control section 580 can measure the electric resistance value of the fourth detection resistor 407. The fifth detection resistor 408 is coupled to the wiring substrate 120, and the control section 580 can measure the electric resistance value of the fifth detection resistor 408. The sixth detection resistor 409 is coupled to the wiring substrate 120, and the control section 580 can measure the electric resistance value of the sixth detection resistor 409.

According to the liquid discharge head 510 of the present embodiment, it is possible to perform temperature adjustment by individually heating, for example, the temperature of the ink in the pressure chamber 12 included in the first pressure chamber group G1, the temperature of the ink in the pressure chamber 12 included in the third pressure chamber group G3, the temperature of the ink in the pressure chamber 12 included in the second pressure chamber group G2, and the temperature of the ink in the pressure chamber 12 included in the fourth pressure chamber group G4. Even when the temperature of the ink differs for each pressure chamber group, the temperature of the ink can be individually adjusted to an appropriate temperature. The liquid discharge device 500 is easier to perform the discharge control of the liquid discharge head 510, which is suitable for the temperature of the ink in the pressure chamber 12.

According to the liquid discharge head 510 of the present embodiment, for example, when the temperature of the ink in the pressure chamber 12 included in the first pressure chamber group G1, the temperature of the ink in the pressure chamber 12 included in the third pressure chamber group G3, the temperature of the ink in the pressure chamber 12 included in the second pressure chamber group G2, and the temperature of the ink in the pressure chamber 12 included in the fourth pressure chamber group G4 are different from each other, it is possible to drive the piezoelectric element 300 corresponding to the temperature of the ink in the pressure chamber 12 included in each pressure chamber row. Further, according to this, the liquid discharge device 500 is easier to perform the discharge control of the liquid discharge head 510, which is suitable for the temperature of the ink in the pressure chamber 12.

E. Other Aspects (E1) In the first embodiment, the heating resistor 601 is formed of platinum (Pt), which is the same material as the first electrode 60 that is an individual electrode. On the other hand, the heating resistor 601 is not limited to the same material as the first electrode 60, and may be formed of the same material as any of the common electrode and the drive wiring. The same advantage can be obtained even with the liquid discharge head 510 of the aspect.

(E2) In the first embodiment, the heating resistor 601 is disposed at the same position as the first electrode 60, which is an individual electrode, in the lamination direction, that is, in the same layer as the first electrode 60. On the other hand, the heating resistor 601 may be disposed in the same layer as either the common electrode or the drive wiring while being not limited to the same layer as the individual electrode. The same advantage can be obtained even with the liquid discharge head 510 of the aspect.

(E3) In the first embodiment, the material of the detection resistor 401 is platinum (Pt) and is formed of the same material as the first electrode 60. On the other hand, the detection resistor 401 may be formed of the same material as any of the common electrode and the drive wiring while being not limited to the individual electrode. As a result, the cost can be reduced by simplifying a manufacturing process as compared with a case where the detection resistor 401 is formed separately from the common electrode or the drive wiring.

(E4) In the second embodiment, the detection resistor 401 is formed of the same material as the first electrode 60 which is an individual electrode. On the other hand, the detection resistor 401 may be formed of the same material as the second electrode 80 which is the common electrode. According to the liquid discharge head 510 of the aspect, for example, the detection resistor 401 and the heating resistor 651 can be formed in a process of forming the second electrode 80, so that the cost can be reduced by simplifying the manufacturing process.

(E5) In the second embodiment, an example is shown in which the second electrode 80 is iridium (Ir) and the first electrode 60 is platinum (Pt). That is, in the second embodiment, an example is shown in the second electrode 80, which is a common electrode, is formed of a material having a higher electric resistance than the first electrode 60 which is an individual electrode. On the other hand, the first electrode 60 is formed of a material having a larger rate of change in electric resistance with respect to a temperature change than the second electrode 80 which is the common electrode, and the heating resistor 651 is formed of the same material as the second electrode 80 which is the common electrode. On the other hand, the first electrode 60, which is the individual electrode, may be formed of a material having a higher electric resistance than the second electrode 80 which is the common electrode, the second electrode 80, which is the common electrode, may be formed of a material having a larger rate of change in electric resistance with respect to the temperature change than the first electrode 60 which is the individual electrode, and the heating resistor 651 may be formed of the same material as the first electrode 60 which is the individual electrode. In this case, the detection resistor 401 may be formed of the same material as the first electrode 60 which is the individual electrode. The detection resistor 401 and the heating resistor 651 can be formed in a process of forming the first electrode 60, so that the cost can be reduced by simplifying the manufacturing process. Further, in this case, the detection resistor 401 may be formed of the same material as the second electrode 80 which is the common electrode while being not limited to the same material as the first electrode 60 which is the individual electrode.

(E6) In the first embodiment, an example is shown in which the heating resistor 601 is formed in the same layer as the first electrode 60 and is formed on the surface of the diaphragm 50 on the −Z direction side so as to be electrically discontinuous with the first electrode 60. On the other hand, the heating resistor 601 may be formed in the same layer as the individual lead electrode 91 and the common lead electrode 92, which function as the drive wiring, and the heating lead electrode 94 which includes the heating lead electrode 94*a* and the heating lead electrode 94*b*, and may be formed to be laminated on the surface of the piezoelectric body 70 on the −Z direction side so as to be electrically continuous with the heating lead electrode 94. That is, the heating resistor 601 may be the same wiring as the heating lead electrode 94. Therefore, the heating resistor 601 is in the same layer as the individual lead electrode 91 and the common lead electrode 92 and is formed so as to be electrically discontinuous. The material of the heating resistor 601 is gold (Au) which is the same material as the individual lead electrode 91 and the common lead electrode

92. As a result, the cost can be reduced by simplifying the manufacturing process as compared with a case where the heating resistor 601 is individually formed with the individual lead electrode 91 and the common lead electrode 92.

(E7) In the first embodiment, an example is shown in which the detection resistor 401 is formed in the same layer as the first electrode 60 and is formed on the surface of the diaphragm 50 on the −Z direction side so as to be electrically discontinuous with the first electrode 60. On the other hand, the detection resistor 401 may be formed in the same layer as the individual lead electrode 91 and the common lead electrode 92, which function as the drive wiring, and the measurement lead electrode 93, which includes the measurement lead electrode 93*a* and the measurement lead electrode 93*b*, and may be formed to be laminated on the surface of the piezoelectric body 70 on the −Z direction side so as to be electrically continuous with the measurement lead electrode 93. That is, the detection resistor 401 may be the same wiring as the measurement lead electrode 93. Therefore, the detection resistor 401 is in the same layer as the individual lead electrode 91 and the common lead electrode 92 and is formed so as to be electrically discontinuous. The material of the detection resistor 401 is gold (Au) which is the same material as the individual lead electrode 91 and the common lead electrode 92. As a result, the cost can be reduced by simplifying the manufacturing process as compared with a case where the detection resistor 401 is individually formed with the individual lead electrode 91 and the common lead electrode 92.

The present disclosure is not limited to the above-described embodiments, and can be realized in various configurations without departing from the gist of the present disclosure. Technical features in the embodiments corresponding to technical features in respective aspects described in outline of the present disclosure can be appropriately replaced or combined in order to solve some or all of the above-described problems or achieve some or all of the above-described effects. Further, when the technical features are not described as essential in the present specification, the technical features can be appropriately deleted.

(1) According to one aspect of the present disclosure, there is provided a liquid discharge head. The liquid discharge head includes a pressure chamber substrate that has a plurality of pressure chambers, a piezoelectric element that is laminated at the pressure chamber substrate, and has an individual electrode individually provided for each of the plurality of pressure chambers, a common electrode commonly provided for the plurality of pressure chambers, and a piezoelectric body provided between the individual electrode and the common electrode in a lamination direction of the piezoelectric element and provided to apply pressure to a liquid in the pressure chamber, a drive wiring that is electrically coupled to the individual electrode and the common electrode, and provided to apply a voltage for driving the piezoelectric body to the piezoelectric body, and a heating resistor that is formed of the same material as any of the individual electrode, the common electrode, and the drive wiring, and provided to heat the liquid in the pressure chamber.

According to the liquid discharge head of the aspect, it is possible to provide the heating resistor inside the liquid discharge head, and it is possible to shorten a distance from the pressure chamber to the heating resistor as compared with a liquid discharge head having a heater externally, so that it is possible to adjust the temperature of the liquid in the pressure chamber well. Further, by providing the heating resistor inside the liquid discharge head, it is possible to suppress a size of the liquid discharge head from being increased.

(2) In the liquid discharge head of the aspect, at least a part of the heating resistor may be disposed at the same position as any of the individual electrode, the common electrode, and the drive wiring in the lamination direction. According to the liquid discharge head of the aspect, the heating resistor can be formed using the same process as a process of forming the individual electrode.

(3) In the liquid discharge head of the aspect, the plurality of pressure chambers may be disposed along a predetermined arrangement direction at the pressure chamber substrate. At least a part of the heating resistor may be disposed on an outer side than the pressure chambers in the liquid discharge head in an intersection direction intersecting the arrangement direction. According to the liquid discharge head of the aspect, heat dissipation from the pressure chamber to the outside of the liquid discharge head can be reduced, and the temperature of the liquid in the pressure chamber can be efficiently adjusted.

(4) In the liquid discharge head of the aspect, the plurality of pressure chambers may include a first pressure chamber row and a second pressure chamber row adjacent to the first pressure chamber row in the intersection direction. The heating resistor may include a first heating resistor for heating pressure chambers included in the first pressure chamber row and a second heating resistor for heating pressure chambers included in the second pressure chamber row. According to the liquid discharge head of the aspect, it is possible to perform temperature adjustment by individually heating the temperature of the liquid in the pressure chamber included in the first pressure chamber row and the temperature of the liquid in the pressure chamber included in the second pressure chamber row.

(5) In the liquid discharge head of the aspect, the plurality of pressure chambers may include a first pressure chamber row and a second pressure chamber row adjacent to the first pressure chamber row in the intersection direction. The first pressure chamber row may include a first pressure chamber group including a plurality of pressure chambers, which are positioned on one side in the arrangement direction, among the plurality of pressure chambers, and a second pressure chamber group including a plurality of pressure chambers, which are positioned in the other side in the arrangement direction, among the plurality of pressure chambers. The heating resistor may include a third heating resistor for heating the plurality of pressure chambers included in the first pressure chamber group, and a fourth heating resistor for heating the plurality of pressure chambers included in the second pressure chamber group. According to the liquid discharge head of the aspect, it is possible to perform temperature adjustment by individually heating the temperature of the liquid in the pressure chamber included in the first pressure chamber group and the temperature of the liquid in the pressure chamber included in the second pressure chamber group.

(6) The liquid discharge head of the aspect may further include a detection resistor that is provided to detect a temperature in the pressure chamber, and formed of the same material as any of the individual electrode, the common electrode, and the drive wiring. According to the liquid discharge head of the aspect, since the detection resistor is provided inside the liquid discharge head, it is possible to reduce the difference between the temperature detected by the detection resistor and the temperature in the pressure chamber as compared with a case where the temperature is measured outside the liquid discharge head.

(7) In the liquid discharge head of the aspect, the common electrode may be formed of a material having a higher electric resistance than the individual electrode, the individual electrode may be formed of a material having a larger rate of change in electric resistance with respect to a temperature change than the common electrode, and the heating resistor may be formed of the same material as the common electrode. According to the liquid discharge head of the aspect, it is possible to apply materials suitable for the heating resistor and the detection resistor, respectively.

(8) In the liquid discharge head of the aspect, the detection resistor may be formed of the same material as the individual electrode. According to the liquid discharge head of the aspect, when forming the detection resistor, it is easy to form the detection resistor in the same process as the individual electrode.

(9) In the liquid discharge head of the aspect, the detection resistor may be formed of the same material as the common electrode. According to the liquid discharge head of the aspect, when forming the detection resistor, it is easy to form the detection resistor in the same process as the common electrode.

(10) In the liquid discharge head of the aspect, the individual electrode may be formed of a material having a higher electric resistance than the common electrode, the common electrode may be formed of a material having a larger rate of change in electric resistance with respect to a temperature change than the individual electrodes, and the heating resistor may be formed of the same material as the individual electrode.

(11) In the liquid discharge head of the aspect, the detection resistor may be formed of the same material as the common electrode. According to the liquid discharge head of the aspect, when forming the detection resistor, it is easy to form the detection resistor in the same process as the common electrode.

(12) In the liquid discharge head of the aspect, the detection resistor may be formed of the same material as the individual electrode. According to the liquid discharge head of the aspect, when forming the detection resistor, it is easy to form the detection resistor in the same process as the individual electrode.

(13) In the liquid discharge head of the aspect, the common electrode may contain iridium, and the individual electrode may contain platinum.

(14) In the liquid discharge head of the aspect, the heating resistor may be disposed on an outer side than the detection resistor in the liquid discharge head. According to the liquid discharge head of the aspect, by disposing the detection resistor at a position close to the pressure chamber, the detection of the temperature of the pressure chamber by the detection resistor is prioritized over the temperature adjustment of the pressure chamber by the heating resistor, so that the temperature detection accuracy of the pressure chamber can be improved.

(15) In the liquid discharge head of the aspect, a cross-sectional area of the heating resistor may be smaller than a cross-sectional area of the detection resistor. According to the liquid discharge head of the aspect, the electric resistance of the heating resistor is larger than the electric resistance of the detection resistor, and the resistance heating of the heating resistor can be used for more efficient heating.

(16) In the liquid discharge head of the aspect, a length of the heating resistor may be longer than a length of the detection resistor. According to the liquid discharge head of the aspect, the electric resistance of the heating resistor is larger than the electric resistance of the detection resistor, and the resistance heating of the heating resistor can be used for more efficient heating.

(17) In the liquid discharge head of the aspect, a power supply circuit for supplying electric power to the piezoelectric body and a power supply circuit for supplying electric power to the heating resistor and the detection resistor may be different circuits from each other. According to the liquid discharge head of the aspect, it is possible to individually execute each of drive control of the piezoelectric element, heating of the liquid in the pressure chamber by the heating resistor, and temperature detection of the pressure chamber by the detection resistor.

(18) According to another aspect of the present disclosure, there is provided a liquid discharge device. The liquid discharge device includes the liquid discharge head according to the first aspect, and a control section that controls a discharge operation of a liquid from the liquid discharge head. According to the aspect of the liquid discharge device, it is possible to easily realize a configuration which is capable of controlling the discharge operation of the liquid discharge head.

The present disclosure can also be realized in various forms other than the liquid discharge device. For example, the present disclosure can be realized in the form of a method for manufacturing a liquid discharge device, a method for controlling the liquid discharge device, a computer program for realizing the control method, a non-temporary recording medium on which the computer program is recorded, or the like.

The present disclosure is not limited to the ink jet method, and can be applied to any liquid discharge device that discharges a liquid other than the ink and a liquid discharge head that is used for the liquid discharge device. For example, the present disclosure can be applied to the following various liquid discharge devices and liquid discharge heads thereof.

(1) An image recording device such as a facsimile device.

(2) A color material discharge device used for manufacturing a color filter for an image display device such as a liquid crystal display.

(3) An electrode material discharge device used for forming electrodes of an organic Electro Luminescence (EL) display, a Field Emission Display (FED), or the like.

(4) A liquid discharge device that discharges a liquid containing a bioorganic substance used for manufacturing a biochip.

(5) A sample discharge device as a precision pipette.

(6) A lubricating oil discharge device.

(7) A resin liquid discharge device.

(8) A liquid discharge device that discharges lubricating oil with pinpoint to a precision machine such as a watch or a camera.

(9) A liquid discharge device that discharges a transparent resin liquid, such as an ultraviolet curable resin liquid, onto a substrate in order to form a micro hemispherical lens (optical lens) or the like used for an optical communication element or the like.

(10) A liquid discharge device that discharges an acidic or alkaline etching liquid for etching a substrate or the like.

(11) A liquid discharge device including a liquid consumption head that discharges any other minute amount of droplets.

The “droplet” refers to a state of the liquid discharged from the liquid discharge device, and includes those having a granular, tear-like, or thread-like tail. Further, the “liquid”

referred to here may be any material that can be consumed by the liquid discharge device. For example, the “liquid” may be a material in a state when a substance is liquefied, and the “liquid” includes a liquid state material with high or low viscosity and a liquid state material, such as a sol, gel water, other inorganic solvent, organic solvent, solution, liquid resin, and liquid metal (metal melt). Further, the “liquid” includes not only a liquid as a state of a substance but also a liquid in which particles of a functional material made of a solid substance, such as a pigment or a metal particle, are dissolved, dispersed, or mixed in a solvent. Further, as a typical example of a combination of a first liquid and a second liquid, in addition to a combination of ink and reaction liquid as described in the embodiments, the following can be mentioned.

(1) Adhesive main agent and curing agent (2) Paint-based paints and diluents, clear paints and diluents (3) Main solvent and diluting solvent containing cells of ink for cells (4) Metallic leaf pigment dispersion liquid and diluting solvent of ink (metallic ink) that develops metallic luster.

(5) Gasoline/diesel and biofuel for vehicle fuel (6) Main ingredients and protective ingredients of medicine.

(7) Light Emitting Diode (LED) fluorescent material and encapsulant

What is claimed is:

1. A liquid discharge head comprising:

a pressure chamber substrate that has a plurality of pressure chambers;

a piezoelectric element that is laminated at the pressure chamber substrate, and has an individual electrode individually provided for each of the plurality of pressure chambers, a common electrode commonly provided for the plurality of pressure chambers, and a piezoelectric body provided between the individual electrode and the common electrode in a lamination direction of the piezoelectric element and provided to apply pressure to a liquid in the pressure chamber;

a drive wiring that is electrically coupled to the individual electrode and the common electrode, and provided to apply a voltage for driving the piezoelectric body to the piezoelectric body;

a detection resistor that defects a temperature in the pressure chamber; and a heating resistor that heats the liquid in the pressure chamber, wherein the detection resistor is formed of the same material as any of the individual electrode, the common electrode, and the drive wiring, the heating resistor is formed of the same material as any of the individual electrode, the common electrode, and the drive wiring, and at least a part of the detection resistor and a part of the heating resistor are disposed at the same position as any of the individual electrode, the common electrode, and the drive wiring in the lamination direction.

2. The liquid discharge head according to claim 1, wherein the plurality of pressure chambers are arranged along a predetermined arrangement direction at the pressure chamber substrate, and at least a part of the heating resistor is disposed on an outer side than the pressure chambers in the liquid discharge head in an intersection direction intersecting the arrangement direction.

3. The liquid discharge head according to claim 2, wherein the plurality of pressure chambers include a first pressure chamber row and a second pressure chamber row adjacent to the first pressure chamber row in the intersection direction, and the heating resistor includes a first heating resistor for heating pressure chambers included in the first pressure chamber row and a second heating resistor for heating pressure chambers included in the second pressure chamber row.

4. The liquid discharge head according to claim 2, wherein the plurality of pressure chambers include a first pressure chamber row and a second pressure chamber row adjacent to the first pressure chamber row in the intersection direction, the first pressure chamber row includes a first pressure chamber group including a plurality of pressure chambers, which are positioned on one side in the arrangement direction, among the plurality of pressure chambers, and a second pressure chamber group including a plurality of pressure chambers, which are positioned in the other side in the arrangement direction, among the plurality of pressure chambers, and the heating resistor includes a third heating resistor for heating the plurality of pressure chambers included in the first pressure chamber group, and a fourth heating resistor for heating the plurality of pressure chambers included in the second pressure chamber group.

5. The liquid discharge head according to claim 1, wherein the common electrode is formed of a material having a higher electric resistance than the individual electrode, the individual electrode is formed of a material having a larger rate of change in electric resistance with respect to a temperature change than the common electrode, and the heating resistor is formed of the same material as the common electrode.

6. The liquid discharge head according to claim 5, wherein the detection resistor is formed of the same material as the individual electrode.

7. The liquid discharge head according to claim 5, wherein the detection resistor is formed of the same material as the common electrode.

8. The liquid discharge head according to claim 1, wherein the individual electrode is formed of a material having a higher electric resistance than the common electrode, the common electrode is formed of a material having a larger rate of change in electric resistance with respect to a temperature change than the individual electrodes, and the heating resistor is formed of the same material as the individual electrode.

9. The liquid discharge head according to claim 8, wherein the detection resistor is formed of the same material as the common electrode.

10. The liquid discharge head according to claim 8, wherein the detection resistor is formed of the same material as the individual electrode.

11. The liquid discharge head according to claim 1, wherein the heating resistor is disposed on an outer side than the detection resistor in the liquid discharge head.

12. The liquid discharge head according to claim 5, wherein a cross-sectional area of the heating resistor is smaller than a cross-sectional area of the detection resistor.

13. The liquid discharge head according to claim 5, wherein a length of the heating resistor is longer than a length of the detection resistor.

14. A liquid discharge device comprising:

the liquid discharge head according to claim 1; and a control section that controls a discharge operation of a liquid from the liquid discharge head.

15. The liquid discharge head according to claim 1, wherein the heating resistor does not include other material than a material of the individual electrode, the common electrode, and the driving wiring.

16. The liquid discharge head according to claim 1, wherein the plurality of pressure chambers are arranged along a predetermined arrangement direction at the pressure chamber substrate, and at least a part of the heating resistor is disposed along the predetermined direction.

17. The liquid discharge head according to claim 16, wherein at least a part of the heating resistor has a linear shape.

18. The liquid discharge head according to claim 16, wherein at least a part of the heating resistor has a meandering shape.

19. The liquid discharge head according to claim 1, further comprising a flexible wiring substrate that electrically coupled to all of the common electrode, the individual electrode, the detecting resistor and the heating resistor.

20. The liquid discharge head according to claim 1, wherein a coupled portion between the detecting resistor and a flexible wiring substrate is positioned inside along an array direction of the plurality of pressure chamber further than a coupled portion between the heating resistor and the flexible wiring substrate.

* * * * *